(12) United States Patent
Canoy et al.

(10) Patent No.: US 9,378,063 B2
(45) Date of Patent: Jun. 28, 2016

(54) MOBILE COPROCESSOR SYSTEM AND METHODS

(71) Applicant: QUALCOMM Incorporated, San Diego, CA (US)

(72) Inventors: Michael-David Nakayoshi Canoy, San Diego, CA (US); Sisil Mehta, San Jose, CA (US); Kirtika Ruchandani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 14/053,790

(22) Filed: Oct. 15, 2013

(65) Prior Publication Data

US 2015/0106823 A1   Apr. 16, 2015

(51) Int. Cl.
G06F 9/50 (2006.01)

(52) U.S. Cl.
CPC .............. *G06F 9/505* (2013.01); *G06F 9/5044* (2013.01); *G06F 2209/509* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 6,990,662 B2 | 1/2006 | Messer et al. | |
| 7,500,112 B1 * | 3/2009 | Wille et al. | 713/194 |
| 7,966,039 B2 | 6/2011 | Sadovsky et al. | |
| 8,112,116 B2 | 2/2012 | Sadovsky et al. | |
| 2005/0213832 A1 * | 9/2005 | Schofield et al. | 382/240 |
| 2010/0124196 A1 | 5/2010 | Bonar et al. | |
| 2011/0016313 A1 * | 1/2011 | Jin et al. | 713/160 |
| 2011/0231469 A1 | 9/2011 | Wolman et al. | |
| 2012/0072481 A1 | 3/2012 | Nandlall et al. | |
| 2012/0131137 A1 | 5/2012 | Singh et al. | |
| 2013/0205158 A1 | 8/2013 | Lin et al. | |
| 2013/0237147 A1 | 9/2013 | Dearman | |

FOREIGN PATENT DOCUMENTS

EP   2602715 A1   6/2013

OTHER PUBLICATIONS

Sjalander et al. A Look-Ahead Task Management Unit for Embedded Multi-Core Architectures. [online] (Sep. 2008). IEEE., pp. 1-9. Retrieved From the Internet <http://ieeexplore.ieee.org/xpls/abs_all.jsp?arnumber=4669231&tag=1>.*

(Continued)

*Primary Examiner* — Emerson Puente
*Assistant Examiner* — Jonathan R Labud
(74) *Attorney, Agent, or Firm* — The Marbury Law Group, PLLC

(57) ABSTRACT

Embodiments include apparatuses, systems, and methods mobile coprocessing. A connection is established between a mobile device and an auxiliary computing device. The mobile device implements a CPU abstraction layer and a virtual CPU between a software stack and a CPU of the mobile device. The abstraction layer allows for the mobile device to offload tasks to the auxiliary computing device while the software stack interacts with the abstraction layer as if the tasks are being executed by the CPU of the mobile device. The mobile device of allocates tasks to the auxiliary computing device based on various parameters, including properties of the auxiliary computing device, metrics of the connection, and priorities of the tasks.

56 Claims, 15 Drawing Sheets

(56) References Cited

OTHER PUBLICATIONS

Kosta et al. ThinkAir: Dynamic resource allocation and parallel execution in the cloud for mobile code offloading. [online] (Mar. 30, 2012). IEEE., pp. 1-9. Retrieved From the Internet <http://ieeexplore.ieee.org/xpls/abs_all.jsp?arnumber=6195845>.*

Flinn J., et al., "Self-tuned remote execution for pervasive computing", Hot Topics in Operating Systems, 2001. Proceedings of the Eighth Workshop on May 20-22, 2001, IEEE, Piscataway, NJ, USA, May 20, 2001, pp. 61-66, XP010583084, DOI: 10.1109/HOTOS.2001.990062 ISBN: 978-0-7695-1040-8.

International Search Report and Written Opinion—PCT/US2014/060196—ISA/EPO—Jan. 9, 2015.

Krintz S C., et al., "Addressing the Energy Crisis in Mobile Computing with Developing Power Aware Software", Internet Citation, 2003, pp. 1-24, XP002660613, Retrieved from the Internet: URL:http://citeseerx.ist.psu.edu/viewdoc/summary?doi=10.1.1.58.9023 [retrieved on Oct. 5, 2011].

Yang K., et al., "On effective offloading services for resource-constrained mobile devices running heavier mobile Internet applications", IEEE Communications Magazine, IEEE Service Center, Piscataway, US, vol. 46, No. 1, Jan. 2008, pp. 56-63, XP011224535, ISSN: 0163-6804.

* cited by examiner

Time: T0

Time: Tschedule

Time: Tb-done

Time: Twait

MOBILE COPROCESSOR SYSTEM AND METHODS

BACKGROUND

A mobile device's processing capabilities are typically limited to the central processing units (CPUs) found on the device. The performance of these CPUs are regulated to account for power limitations (e.g., battery life or output) and thermal issues (e.g., overheating caused by heavy usage or improper ventilation) encountered when in use; which directly impacts the usability of the device. CPU performance is also dictated by the processing speed limitations of the CPU itself.

Mobile devices are often upgraded through frequent replacement. Each time a mobile device is replaced, the owner incurs the expense of having to replace the device. The decision to replace the mobile device is commonly driven by the performance of the device's CPU. New software processing requirements frequently outpace the processing capabilities of the CPU of a mobile device soon after it is purchased. Mobile device upgrades are generally subsidized by service providers given certain parameters (e.g., expiration of a current contract for service), which limits how often users can upgrade to the latest model with a faster CPU. Most mobile device owners wait for eligibility for these subsidies rather than paying full price, which could mean waiting a year or more. Consequently, users frequently must deal with slow processing performance of new, more complex applications until their service contract allows for the next upgrade.

SUMMARY

The methods and systems of various embodiments provide circuits and methods for mobile coprocessing by a system including a mobile device central processing unit (CPU) and an auxiliary computing device configured to take on some processing tasks when the devices are within range of each other. The mobile device CPU may be configured to execute an embodiment method including establishing a wireless communication link between the mobile device CPU and the auxiliary computing device, requesting processing properties of the auxiliary computing device, in which the processing properties include a gradient of a processing property of the auxiliary computing device, allocating a first processing task to the auxiliary computing device based on processing properties of the auxiliary computing device and one or more allocation parameters, determining whether a first result of the first processing task from the auxiliary computing device is received, and assembling the first result of the first processing task with a second result of a second processing task performed by the mobile device CPU to render an output.

The mobile device CPU may be further configured to determine one or more communication link metrics of the wireless communication link, in which the allocation parameters include the communication link metrics, which may include one or more of a communication link quality, strength, and latency.

The mobile device CPU may be configured to execute an embodiment method further including assigning a task priority to the first processing task based on one or more of a processing task latency tolerance, computational complexity, and significance to the output, in which the allocation parameters include the task priority, and offloading the first processing task to the auxiliary computing device. The mobile device CPU may be configured to execute an embodiment method further including concurrently offloading the second processing task to the auxiliary computing device or another auxiliary computing device during offloading the first processing task.

In the various embodiments, the processing properties of the auxiliary computing device may include one or more of computing capabilities and computing resource availability, and the allocation parameters may include the processing properties of the auxiliary computing device, which may be considered when dynamically reallocating the first processing task based on changes in the allocation parameters.

The mobile device CPU may be configured to execute an embodiment method further including creating an abstraction layer configured to enable allocating the first processing task between the mobile device CPU and the auxiliary computing device.

In an embodiment, the mobile device CPU may be configured to execute an embodiment method in which assembling the first result of the first processing task with the second result of the second processing task to render the output may include receiving the first result of the first processing task from the auxiliary computing device, determining whether a time for utilizing the first result as part of the output has passed, determining whether the first result is useful for a current processing frame or next output frame, holding the first result when the time for utilizing the first result as part of the output has passed and the first result is useful for the current processing frame or the next output frame, and discarding the first result when the time for utilizing the first result as part of the output has passed and the first result is not useful for the current processing frame or the next output frame.

In an embodiment, the mobile device CPU may be configured to execute an embodiment method in which assembling the first result of the first processing task with the second result of the second processing task to render the output may further include receiving the first result of the first processing task from the auxiliary computing device, determining whether the mobile device CPU is ready to utilize the first result as part of the output, and holding the first result before the mobile device CPU is ready to utilize the first result as part of the output.

In an embodiment, the mobile device CPU may be configured to execute an embodiment method in which assembling the first result of the first processing task with the second result of the second processing task to render the output includes receiving the first result of the first processing task from the auxiliary computing device, determining whether utilizing the first result as part of the output is dependent on a third result, determining whether the third result is available, holding the first result when utilizing the first result as part of the output is dependent on the third result and before the third result is available, and utilizing the first result as part of the output when utilizing the first result as part of the output is dependent on the third result and the third result is available.

In an embodiment, the mobile device CPU may be configured to execute an embodiment method in which assembling the first result of the first processing task with the second result of the second processing task to render the output includes determining whether utilizing the first result as part of the output should be utilized with a third result, determining whether the third result is available, utilizing the first result as part of the output when utilizing the first result as part of the output should be utilized with the third result and the third result is available, determining whether utilizing the first result as part of the output can wait for when the third result is available, holding the first result when utilizing the first result as part of the output should be utilized with the third result, before the third result is available, and when utilizing the first result as part of the output can wait to be utilized for when the third result is available, and utilizing the first result as part of the output when utilizing the first result as part of the output should be utilized with the third result, before the third result is available, and when utilizing the first result as part of the output cannot wait to be utilized for when the third result is available.

In an embodiment, the mobile device CPU may be configured to execute an embodiment method that may further include determining whether the first result is available, determining whether the output needs the first result, determining whether a previously received result can be utilized to produce the output, and producing a lower resolution version of the output when the first result is not received, the first result is needed to produce the output, and no previously received result may be utilized to produce the output.

In an embodiment, the auxiliary computing device may be configured to execute an embodiment method including receiving a request for the processing properties of the auxiliary computing device from the mobile device CPU, determining computing resources to make available to the mobile device CPU, sending the processing properties of the auxiliary computing device to the mobile device CPU, receiving the first processing task from the from the mobile device CPU, performing the first processing task, and returning the first result of the first processing task to the mobile device CPU.

In an embodiment, the wireless communication link may be established on a picocell or femtocell of a cellular network, and data may be transferred over the wireless communication link by one of asymmetrical transfer, compressed transfer, and encrypted data transfers.

An embodiment system includes a mobile device and an auxiliary computing device configured as described above. An embodiment includes a mobile device including means for performing mobile device functions of the operations described above. An embodiment includes an auxiliary computing device including means for performing auxiliary computing device functions of the operations described above. An embodiment includes a non-transitory processor-readable medium having stored thereon processor-executable software instructions configured to cause a processor to perform operations described above.

DETAILED DESCRIPTION

Figure 1:
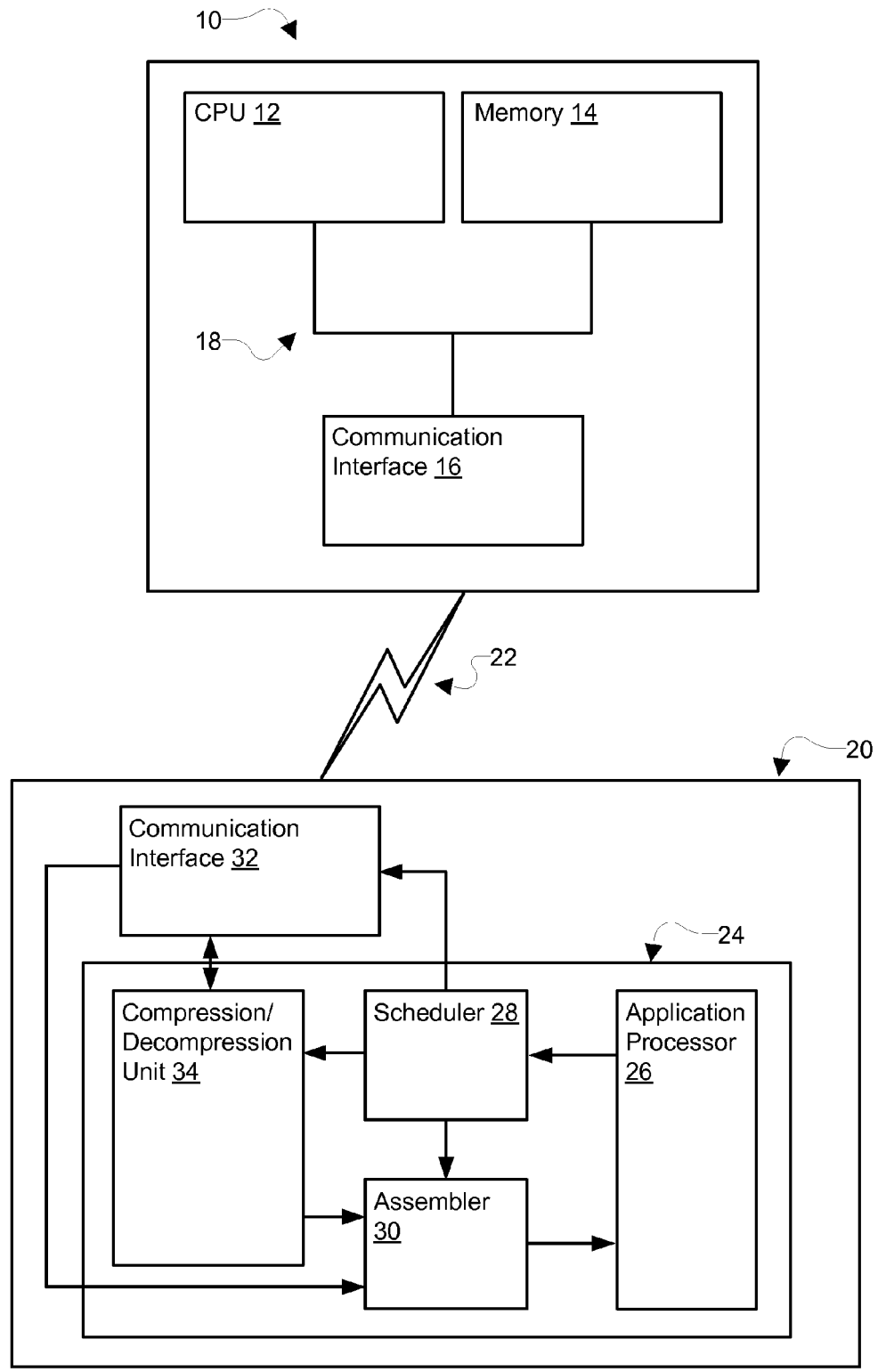
FIG. 1 is a component block diagram illustrating a system having a mobile device communicatively connected to an auxiliary computing device in accordance with an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor, and operate under battery power such that power conservation methods are of benefit. While the various embodiments are particularly useful for mobile computing devices, such as smartphones, which have limited resources and run on battery power, the embodiments are generally useful in any electronic device that is compatible for use with a wirelessly connected auxiliary computing device for providing on the fly additional computing resources.

A technique to relieve the stress on a CPU and improve the performance of a computing device is to engage multiple processors to handle parts of the load. Sometimes the other processors may be specialized processors (e.g., graphics processing units (GPUs), accelerated processing unit (APUs), and physics processing units (PPUs)) designed specifically to handle certain types of loads. These other processors may be integral to the computing device, or they may be remote. In a mobile device, the limited physical space, power availability, and connection stability of the mobile device can make this solution problematic.

The various embodiments include methods, systems, and devices configured to improve the perceived performance of the mobile device by providing additional, proximity, availability, capability, and process priority based scheduling and assembly of processes executed on auxiliary computing resources. An embodiment implements computing functions, e.g., instruction processing and storage, for a mobile device on an auxiliary computing device. The system may include an auxiliary computing device that provides additional processing power (e.g., MIPS (millions of instructions per second)) and memory (e.g., RAM, FLASH, HDD) to the mobile devices that can leverage processing offloading in a personal area network or local area network (e.g., Wi-Fi, Bluetooth, cellular picocell, cellular femtocell, or other wireless protocol). Unlike many Cloud based solutions, the information stored on the auxiliary computing device is transient, like temporary or browser cache files, and is not intended for permanent storage on the device (though it could do it if configured to do so). The auxiliary computing device functions as the mobile device's coprocessor when the two devices are within wireless communication range (i.e., in proximity). Thus, unlike cloud-based and server-client systems, communications between the mobile device and the auxiliary computing device are via direct, local wireless communications. Further, unlike many cloud-based and server-client systems, the auxiliary computing device performs coprocessing of tasks assigned by the mobile device that are dynamic.

Embodiments of this auxiliary computing device may be implemented a separate "box" that user's purchase whose function is solely to augment computing power for mobile devices within range of its wireless transceiver. When a mobile device comes within proximity of "the box," a wireless link is established and "the box" begins supporting/augmenting the mobile device's processor by performing some of the computational tasks.

To implement these embodiments, the mobile device may be configured to perform operations, such as abstraction of CPU tasks via a CPU abstraction layer, and segmenting/tiering processing tasks (taking into account transmission delays) so that a mobile device can manage processing tasks depending on connectivity with an auxiliary computing device. For example, the mobile device may support an application when out of range of auxiliary computing device, arrange for improved application processing performance when auxiliary computing device is within marginal communication range, and even more improved application processing performance when auxiliary computing device is nearby so that the communication link is strong.

The mobile device may connect to the auxiliary computing device via a direct wireless link, such as Bluetooth or WiFi. Computational tasks may be assigned to the auxiliary computing device from the mobile device while taking into account a number of parameters. Such parameters may include the strength and/or quality of the link connecting the devices, the capabilities and availability of the resources of the auxiliary computing device, the priority/importance/need of the tasks, and gradients or trends in the quality of signal strength of the wireless link. Other parameters may include the resource requirements for the task, the latency tolerance of the software for the task, and the latency (related to link quality) of the link with the auxiliary computing device. The mobile device may assign computing tasks to the auxiliary computing device dynamically based on one or more of these parameters.

The mobile device may also assemble the results of the tasks executed by the auxiliary computing device and by the mobile device itself to produce an output of the mobile device. Assembling the results of the tasks may take into account a number of parameters. Such parameters may include dependence on whether other tasks have been processed, the priority/importance/need of the results, whether the results are useful currently or in the future, resource availability of the mobile device, and time until the results will be used. The mobile device may assemble the results of the computing tasks from the auxiliary computing device and itself dynamically based on one or more of these parameters.

The auxiliary computing device may provide on the fly additional processing power usable by the mobile device processor. For instance, the mobile 20 may offload computations pertaining to physics and sounds for objects in games, in real-time, to the auxiliary computing device to provide a superior gaming experience while conserving resources on the mobile device for other tasks such as rendering. In another case, the mobile device 20 may offload Facebook® and Twitter® status update queries to the auxiliary computing device to conserve resources on the mobile device for other tasks. The mobile device may check or be notified by the auxiliary computing device at a lower update rate, freeing it from frequently checking Facebook® and/or Twitter® on its own. For raw MIPs, the auxiliary computing device could provide temporary CPU and GPU processing for games, application, and movies, for example. The auxiliary computing device could house a number of processors, such as Snapdragon® processors produced by QUALCOMM, Inc., and give the mobile device the CPU power of that number of chips.

The various embodiments may be implemented within a variety of systems, such as the example mobile coprocessing system illustrated in FIG. 1. Referring to FIG. 1, the auxiliary computing device 10 comprises at least one of each of a processing unit (PU) 12, a memory 14, a communication interface 16, and a communication bus 18. Other embodiments may replace the processing unit 10 with an alternative processor, or may include additional processors. Such other processors may include, for example, one or more of a CPU, a microcontroller, a microprocessor, a graphics processing unit (GPU), an accelerated processing unit (APU), a physics processing unit (PPU), or any programmable logic device.

The memory or storage unit 14 may include any of a wide array of volatile and non-volatile types of memory. In an embodiment the mobile coprocessing system may include one or more of various types of a random access memory (RAM), a read only memory (ROM), a flash memory, and a hard disk drive (HDD). Other types of memory may include magnetic, optical, or hybrid memory devices.

The communication interface 16 may include a combination of items configured to enable the auxiliary computing device 10 to communicate over a network 24 (not shown). Such items may include a radio frequency (RF) transceiver, an antenna, and a modem. The communication interface 16 may be used with the other components if the auxiliary computing device 10 to implement various wireless transmission protocol stacks and interfaces.

The auxiliary computing device 10 may communicate with the mobile device 20 via a local wireless communication link 22. The auxiliary computing device 10 and the mobile device 20 may connect directly over a wireless ad-hoc network established between the two devices 10, 20, when in wireless communication range of each other. Such local wireless communications link 22 may be implemented through various wireless communications protocols including, for example, Peanut®, Bluetooth®, Zigbee®, Wi-Fi, and RF radio. The wireless communication link 22 may allow the auxiliary computing device 10 and the mobile device 20 to transfer data between the devices. Transfer of the data may be accomplished through asymmetrical, compressed, and/or encrypted data transfer.

The communication bus 18 may provide a path for communication between the various components of the auxiliary computing device 10. Signal transmission over the communication bus 18 may be implemented by serial or parallel communication.

The mobile device 20 may include, among other components, a processing unit 24, an application processor 26, a scheduler 28, an assembler 30, a communication interface 32, and a compression/decompression unit 34. The processing unit 24 may be implemented in various forms, such as, a CPU, a microprocessor, an integrated circuit, an system on chip, and the like. An application processor 26 may be included as a hardware and/or software component of the processing unit 24 or may be a separate component with its own hardware capable of supporting processing of application code. Similarly, the scheduler 28, the assembler 30, and the compression/decompression unit 34 may be hardware and/or software components of the processing unit 24, or they may be implemented as one or more separate components of the mobile device 20 having their own hardware. The communication interface 32 may be similar to the communication interface 16 of the auxiliary computing device 10 described herein.

The scheduler 28 and assembler 30 may be implemented as a single separate component of the mobile device 20 or individual components of the mobile device 20. In either instance the hardware of the scheduler 28 and assembler 30 may be capable of receiving task from the application processor 24 and scheduling the task for offloading to the auxiliary computing device 10. The hardware may also be capable of communicating instructions to execute the offloaded task via the communication interface 32, and to provide the results of the tasks to the application processor 26 at appropriate times.

In an aspect, the scheduler 28 and the assembler 30 may be implemented as standalone software, system software, or application specific software. As standalone or system software, the scheduler 28 and the assembler 30 may be capable of managing offloading tasks and providing received results of the offloaded tasks at a system-wide level and across multiple applications. As an application specific software, the scheduler 28 and the assembler 30 may be integrated into an application and mange offloading tasks and providing received results for the application.

Figure 2:
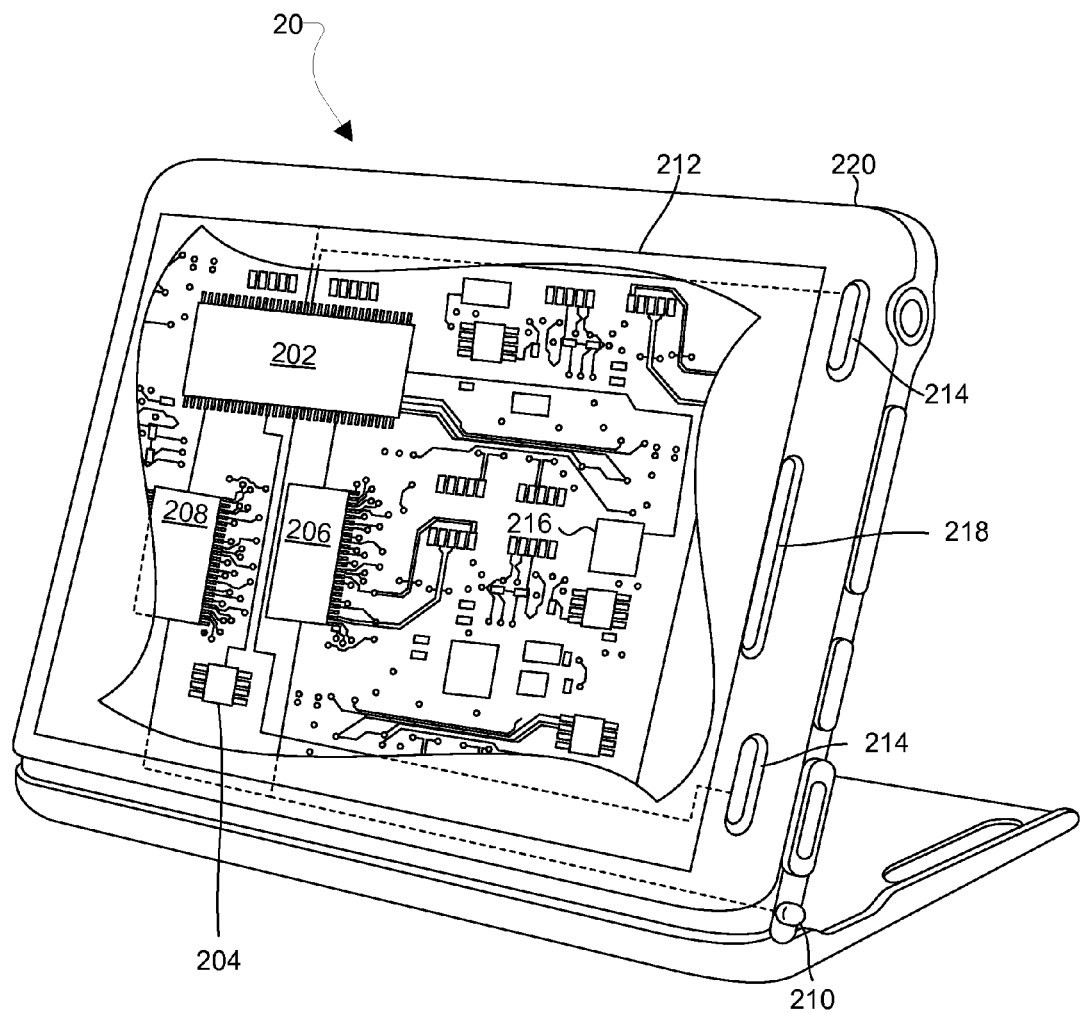
FIG. 2 is a component diagram of an example mobile device suitable for use with the various embodiments.

FIG. 2 illustrates an example mobile device 20 suitable for use in the mobile coprocessing system. In various embodiments, the mobile device 20 may include an processor 202 coupled to a touchscreen controller 204 and an internal memory 206. The internal memory 206 may be volatile or non-volatile memory, and may also be secure and/or encrypted memory, or unsecure and/or unencrypted memory, or any combination thereof. The touchscreen controller 204 and the processor 202 may also be coupled to a touchscreen panel 212, such as a resistive-sensing touchscreen, capacitive-sensing touchscreen infrared sensing touchscreen, etc. The mobile device 20 may have one or more radio signal transceivers 208 (e.g., Peanut®, Bluetooth®, Zigbee®, Wi-Fi, RF radio) and antennae 210 for sending and receiving. The transceivers 208 and antennae 210 may be used with the above-mentioned circuitry to implement the various wireless transmission protocol stacks and interfaces. The mobile device 20 may include a cellular network wireless modem chip 216 that enables communication via a cellular network. The mobile device 20 may include peripheral device connection port 218 coupled to the processor 202. The peripheral device connection port 218 may be singularly configured to accept one type of connection, or multiply configured to accept various types of physical and communication connections, common or proprietary, such as USB, FireWire, Thunderbolt, or PCIe. The mobile device 20 may also include speakers 214 for providing audio outputs. The mobile device 20 may also include a housing 220, constructed of a plastic, metal, or a combination of materials, for containing all or some of the components discussed herein.

Figure 3:
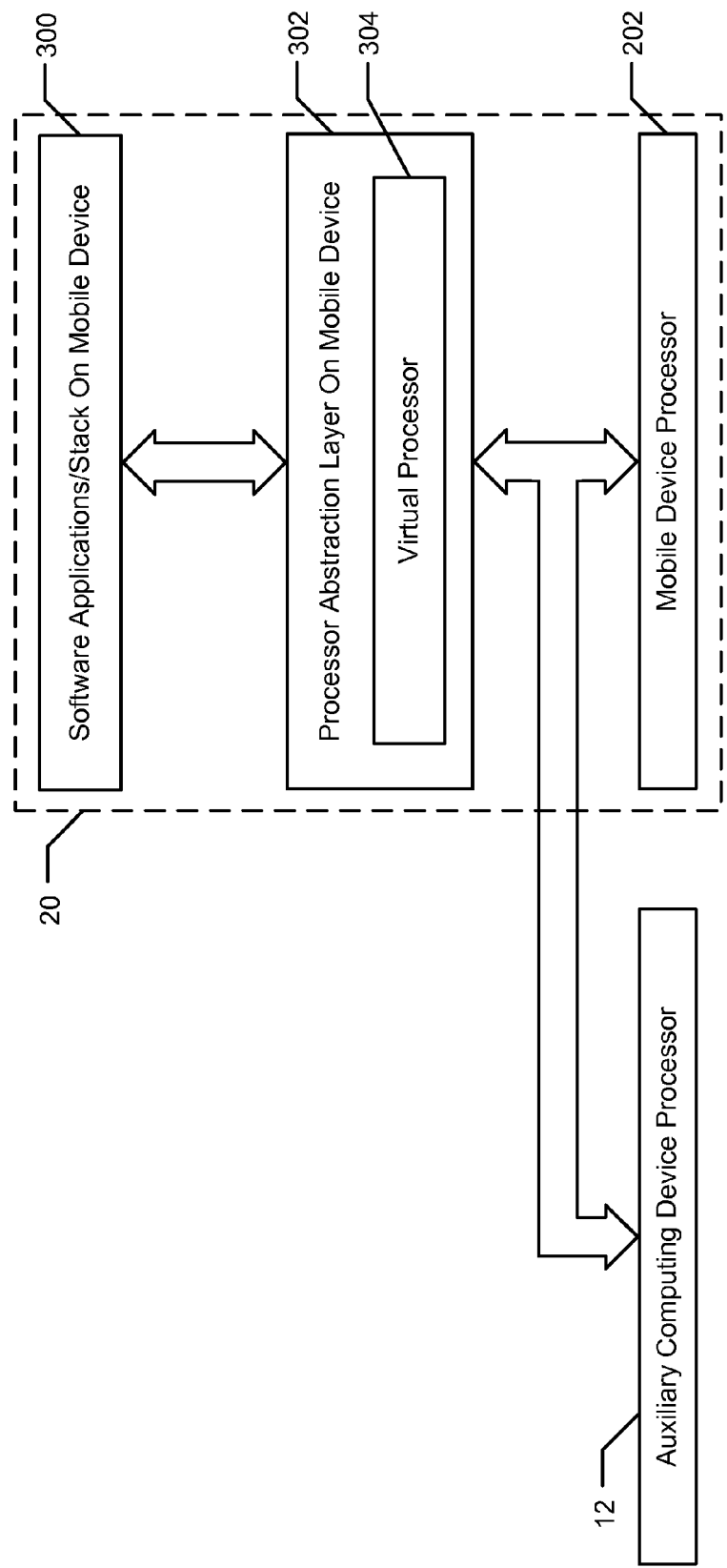
FIG. 3 is a schematic diagram illustrating a system implementation of mobile coprocessing suitable for use with the various embodiments.

FIG. 3 illustrates a system implementation of mobile coprocessing suitable for use with the various embodiments. Coprocessing may be achieved through adding a CPU abstraction layer (CAL) 302 between traditional software stack 300 and the CPU 202 of the mobile device 20. This CAL 302 allows virtualization of the CPU 202 that enables easily adding one or more virtual CPUs 304 to the mobile device 20 without redesigning hardware. These virtual CPUs 304 represent to the software stack 400 virtual copies of the CPU 202. In some instances the virtual CPUs 304 may have different parameters than the CPU 202, such as CPU frequency and number of cores etc. These differences may be accounted for by the scheduler 28. The physical processors performing the operations of the virtual CPUs 304 may include the CPU 202 of the mobile device and/or the processor 12 of the auxiliary computing device 10.

In an aspect, the CAL 302 allows the software stack 300 to operate as if it is interacting with the CPU 202. A software implementing instructions of the software stack 300 may be programmed for a specific computing platform and thus interact with the CPU 202 in a particular way. The CAL 302 may translate communications between the software stack 300 and the processor 12 such that the communications are compatible with each of the software implementing instructions on the software stack 300 and the processor 12. In some cases this may not be necessary because the processor 12 is designed to support the platform for which the software is programmed. Yet, the CAL 302 may still be used to direct instructions from the software stack 300 to the desired CPU 12 or 202. As such, the software may not be concerned with managing the scheduling of offloading task and providing the received results to complete the instructions of the software stack 300. These functions may be handled by the CAL 302 through implementation of the scheduler 28 and the assembler 30.

In another aspect, the software, implementing instructions of the software stack 300, may include the scheduler 28 and the assembler 30, and may be aware that the CAL 302 is directing task to the CPU 12. In these instances the software, via the scheduler 28 and the assembler 30, is able to know when tasks are offloaded, and to know whether results are available and to provide the results for implementing instructions of the software stack 300 on the CPU 202.

The auxiliary computing device 10 may also provide additional transient, temporary, or permanent storage via memory 14. For example, a mobile device with a web browser cache limited to 100 MB may have its cache extended by using cache memory in the auxiliary computing device, with the amount of cache extension being determined by an amount required for a particular task. For instance, the auxiliary computing device may have a 10 GB memory 14, parts of which may be dedicated for certain task, or currently being used. When in communication with mobile device 20, a portion of the memory 14, say 1 GB for when the mobile device 20 is being used in a home environment, may be allocated for use by the mobile device 20.

In an aspect, this memory 14 may also be represented to the software stack 300 by an abstraction layer and virtualization of the memory 14. In such an example, the software stack 300 may interact with the abstraction layer and virtual memory as if the virtual memory was memory 206 of the mobile device 20, when in actuality the software stack 30 may be indirectly interacting with the memory 14 of the auxiliary computing device 10. Virtualization of the memory 14 may be useful when implementing latency tolerant instructions of the software stack 300, such as web-page caching.

In another aspect, the software may need to be aware of when it is accessing the memory 206 of the mobile device 20 or the memory 14 of the auxiliary computing device 10. A difference may be that the memory 206 may have lower latency times for memory access tasks than the memory 14 of the auxiliary computing device 10 because of the physical distance and networking delays. In some instances implementing instructions of the software stack 300 may require faster memory access. In these case the software may chose which memory 14, 206, to access based on either or both of having the necessary data and time to access the data.

Figure 4:
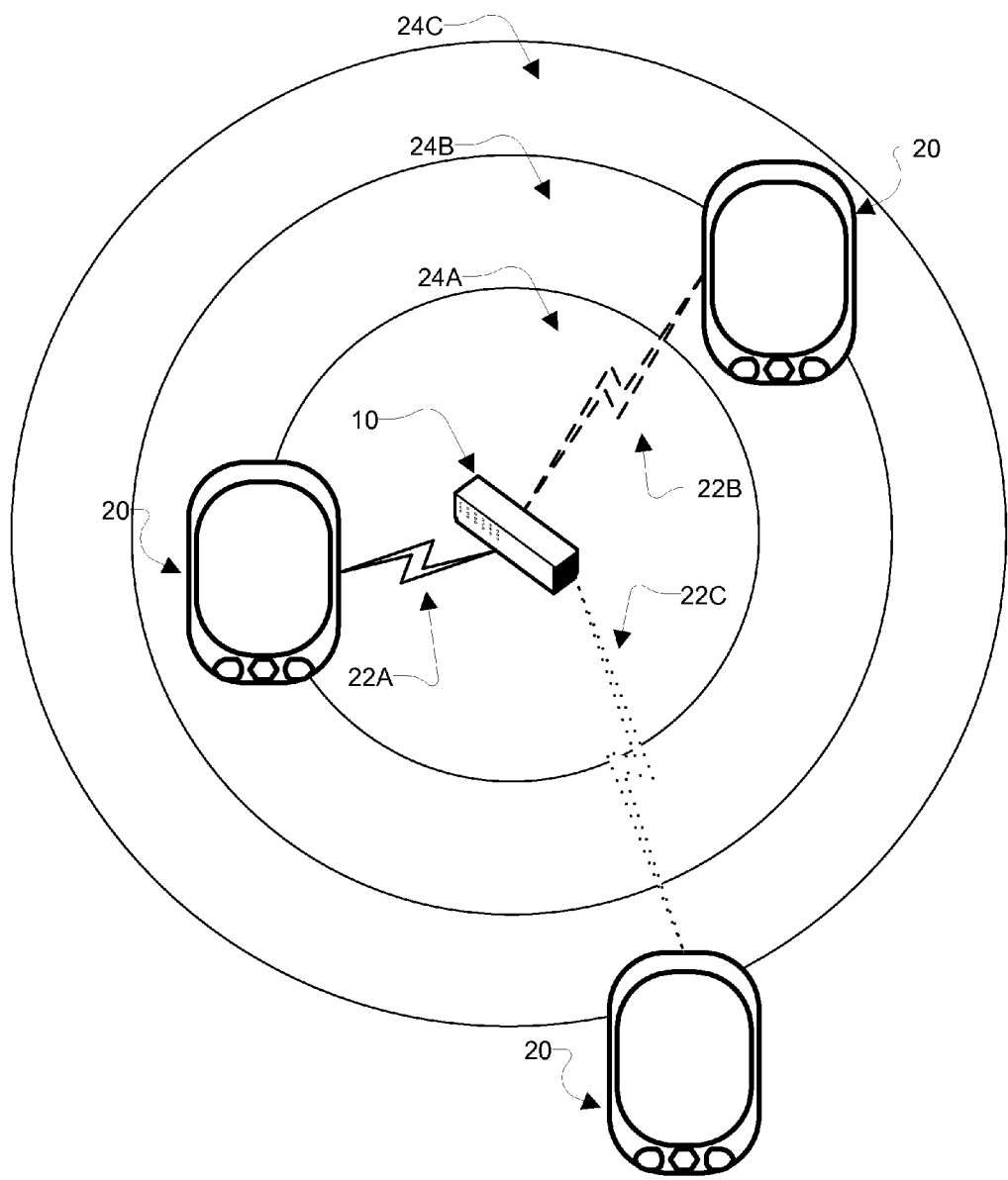
FIG. 4 is a schematic diagram illustrating various connections of the system having the mobile device communicatively connected to the auxiliary computing device in accordance with an embodiment.

FIG. 4 illustrates various connections of the system having the mobile device communicatively connected to the auxiliary computing device in accordance with an embodiment. Offloading of processing tasks and memory may depend on a number of factors. Some of the factors include one or more communication metrics, such as signal strength, link quality, latency, available bandwidth, error rates, and performance gradients (e.g., a rate of change of link quality) of the local wireless communications link 22 between the two devices 10, 20. In some embodiments, the performance gradients of the local wireless communications link 22 may be measurements of one or more of signal strength, link quality, latency, available bandwidth, error rates, and other communication metrics over time.

A mobile device 20 may reside at any time in one of multiple zones 24A, B and C of the network 24. While the zones 24A, B and C in FIG. 4 may seem to represent distance from the auxiliary computing device 10, it is not necessary that distance be the only factor in the signal strength, quality, or latency. Signal strength, quality, or latency may be affected by a number of other variables, for example, interfering signals, attenuation barriers, power, protocol, splitting of the signal and/or signal generating resources. For example, the zones 24A, B and C may represent varying signal strength, quality, and/or latency. The zones 24A, B and C in FIG. 4 may be arranged in order of decreasing signal strength and/or quality and/or increasing latency, so zone 24A represents the best signal strength and/or quality and/or least latency, and zone 24C represents the worst signal strength and/or quality and/or most latency. The local wireless communication links 22A, B, and C similarly represents the level of signal strength, quality, and/or latency in which wireless link 22A represents the best signal strength and/or quality and/or least latency, and wireless link 22C represents the worst signal strength and/or quality and/or most latency. In this example, the mobile device 20 may allocate more processing and/or memory tasks to the auxiliary computing device over the wireless link 22A when residing in zone 24A where there is the best link, and thus the greatest bandwidth and shortest transmission delay. If the mobile device 20 were to change residence from zone 24A to zone 24B or C, then the mobile device 20 may allocate fewer processing and/or memory tasks, or more delay-tolerant tasks to the auxiliary computing device 10. The reverse example also holds true when the mobile device 20 moves from a worse link zone 24B or C to a better link zone 24A or B, respectively, then the mobile device 20 may allocate more processing and/or memory tasks or less delay-tolerant tasks to the auxiliary computing device 10.

A result of managing the offloaded tasks in accordance with an embodiment may be that the output of the mobile device 20 may smoothly, or gracefully, transition between perceived levels of performance or quality. When the mobile device 20 can offload tasks in greater number and with greater complexity while receiving a high number of results from those offloaded tasks in a timely manner, the output on the mobile device 20 will improve. However, if the number results received in a timely manner begins to reduce, the mobile device 20 can manage which of the received results to use in the output and what tasks to schedule such that the output smoothly shifts from higher to lower perceived levels of performance or quality.

Figure 5:
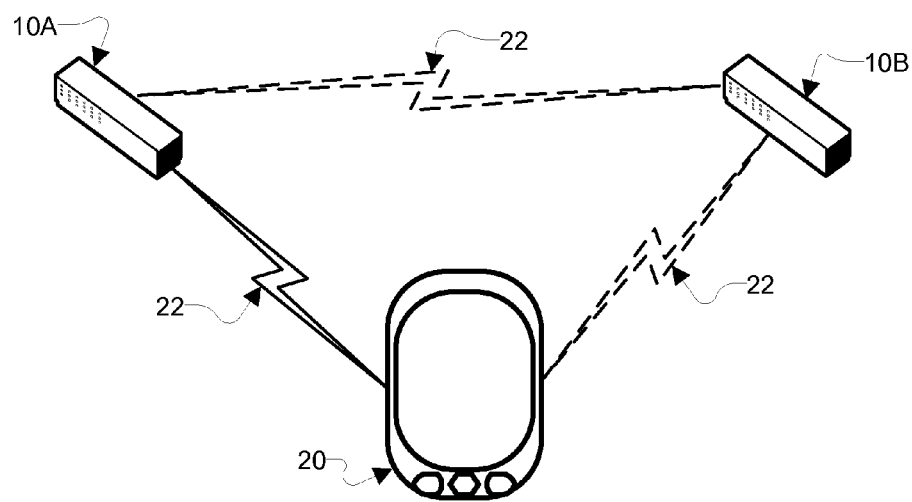
FIG. 5 is a schematic diagram illustrating various connections of the system having the mobile device communicatively connected to the auxiliary computing device in accordance with an embodiment.
Figure 6:
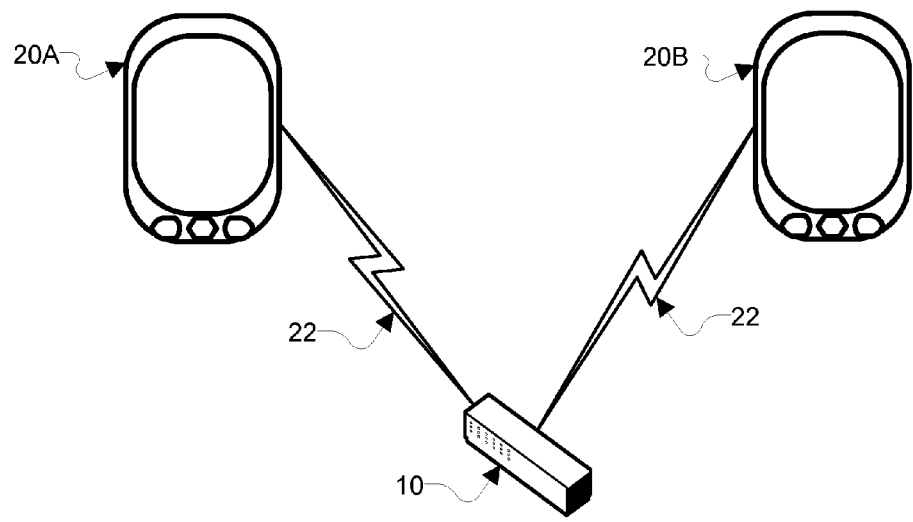
FIG. 6 is a schematic diagram illustrating various connections of the system having the mobile device communicatively connected to the auxiliary computing device in accordance with an embodiment.

FIGS. 5 and 6 illustrate various connections of the system having the mobile device communicatively connected to the auxiliary computing device in accordance with an embodiment. In various embodiments, any number of mobile devices 20 may communicate with any number of auxiliary computing devices 10 over any number of wireless communication links 22. It is conceived that auxiliary computing devices 10 may communicate with each other to manage the assigned loads from mobile devices 20. The auxiliary computing device 10 and the mobile device 20 may each include a communication interface that may accommodate connections to multiple mobile devices 10 and/or auxiliary computing devices 10. For example, the communication interfaces for each device 10, 20, may support multiple radio frequency channels or different radio frequency technologies. In some instances, the auxiliary computing device 10 and the mobile device 20 may each have multiple communication interfaces to support the multiple connections. These communication interfaces may allow for concurrent communication (including offloading) between multiple connected devices 10, 20. The auxiliary computing device 10 may also enable user processing security, that is, user processing data may be encrypted on the auxiliary computing device 10. The auxiliary computing device 10 may detect compatible mobile devices 20. The mobile device 20 may detect the auxiliary computing devices 10 that can be used as coprocessors.

The tasks the mobile device 20 allocates to the auxiliary computing device 10 may or may not be tasks that the mobile device 20 would otherwise execute. The extra resources provided by the auxiliary computing device 10 may allow the mobile device 20 to offload tasks that are executed by the mobile device 20, thereby reducing the load on the CPU 202 of the mobile device and increasing the perceived performance of the mobile device 20. A similar determination to offload tasks to the auxiliary computing device 10 may be made on the basis of battery power consumption and performance. The mobile device 20 may offload tasks where the process of offloading the tasks and receiving the results of the offloaded tasks would consume less power than executing the task on the mobile device 20 itself and result in improved battery performance. The mobile device 20 may also offload tasks that it would not or could not perform due to the limits of the mobile device's CPU 202 (e.g., CPU processing limits would result in overall degraded performance if the CPU 202 performed those tasks). Such tasks may be nonessential tasks, but would enrich a user experience if performed. Thus, the auxiliary computing device 10 may be used to execute such tasks to enrich the user experience in ways that would not be possible if all processing were accomplished by the CPU 202 of the mobile device 20.

In an example of a video game application the physics for game world objects may be classified and separated based on its effect on game play and user experience ("must have"-physics, "good to have"-physics, and "mere eye-candy effects"-physics). In some embodiments, the physics of the game may be implemented using physics engines, such as PhysX™ by NVIDA Corp., Newton Game Dynamics™ by Julio Jerez and Alain Suero, Open Dynamics Engine™ by Russell Smith, Bullet Physics Library by Erwin Coumans, and Havok Physics by Telekinesys Research Ltd, t/a Havok. A scene in the video game may have objects, such as 3 cubes, C1, C2, and C3. The mobile device 20 may send physics processing data for the objects, such as orientation, velocity vector, mass, an object ID, rotation, inertia, and other object data, such as, how the objects shatters during collisions with other objects, to the auxiliary computing device 10. The physics processing data sent may be only for the object processing that the mobile device 20 decides to offload, such as for cubes C1 and C2. After the auxiliary computing device 10 has processed the results (C1' and C2') it could return data, such as rendering properties, of the same fields received from the mobile device 20. Alternatively, the auxiliary computing device 10 may return a subset of the fields, such as orientation data, like the x, y, and z coordinates for each vertex of the cubes C1 and C2 , and identifiers that relate the data to the objects. In another embodiment, the auxiliary computing device 10 may return entirely new fields, such as data indicating actions related to the object data received, like "show-fog," that are useful to the mobile device 20 as the returned data relates to processing of C1' and C2'.

Similar to the example of offloading physics processing, the mobile device 20 may offload a variety of other processing tasks. Examples of such processing tasks include graphics, video, image, audio, and various types if information, data, and signal processing tasks.

In a another example, the processing to generate sounds presented to a user in a game or virtual reality setting may be offloaded by the mobile device 20 to the auxiliary device 10. The sound presented to the user/player may depend on various sound parameters. For example, the characteristics of source sounds, such as frequency and amplitude, a location of the source in relation to a virtual character in the game setting, and properties of virtual objects in an environment which may interact with sound waves causing effects such as diffraction and reflection of the sound waves. The sound presented to the player may be computed as a function of the sound parameters. At a beginning of the game, the mobile device 20 may send to the auxiliary device 10, data about the virtual objects and their properties, and about the characteristics of the source sounds and their sources. At a beginning of each frame, the mobile device 20 may send the position of the player in the game world to auxiliary device 10. Based on these parameters, the auxiliary device 10 may return data about the sound presented to the user, such as its frequency, content, and amplitudes. Also, sounds that are from objects or players at a distance in the game may be played directly from a speaker coupled to the auxiliary device 10, rather than being played from the mobile device 20, thereby adding another dimension to the game experience.

In an embodiment the methods described herein may be implemented before, during, or after the initiation of any application on the mobile device 20. For example, if a video game application is launched on a mobile device prior to being in proximity of the auxiliary computing device 10 the mobile device 20 may determine not to render certain physics processing data. Therefore, mobile device may not load the necessary software resources to be able to process the physics data. During the time when the video game is running, if the mobile device 20 enters into the proximity of the auxiliary computing device 10, the mobile device may then determine that it can render certain physics data for the video game, the processing of which may be handled by the auxiliary computing device 10.

Figure 7:
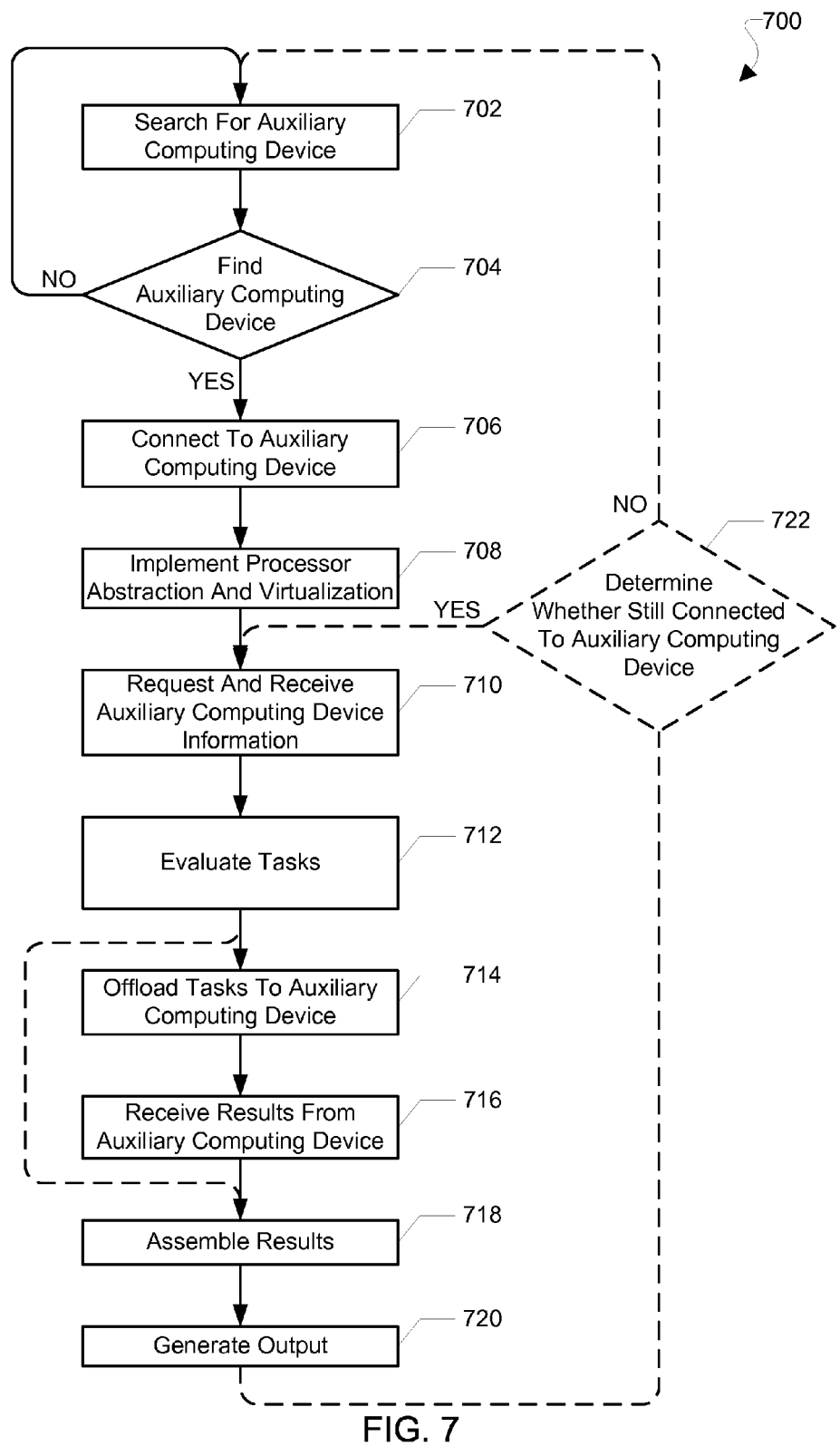
FIG. 7 is a process flow diagram illustrating an embodiment method for executing mobile coprocessing on the mobile device.

FIG. 7 is a process flow diagram illustrating an embodiment method for executing mobile coprocessing on the mobile device 700. The mobile device 20 may search the wireless network 24 for available auxiliary computing devices 10 in block 702. In determination block 704, the mobile device 20 determines if it has found one of more auxiliary computing devices 10. If no auxiliary computing device 10 is found (i.e. determination block 704="No"), the mobile device 20 returns to block 702 and continues to search for the auxiliary computing device 10. If at least one auxiliary computing device 10 is found (i.e. determination block 704="Yes"), in block 706 the mobile device 20 connects to the auxiliary computing device 10 via the network connection 22.

Detection of and connection to the auxiliary computing device 10 may occur through third parties. For example, the mobile device 20 may communicate with the auxiliary computing device 10 through a gateway device, a network router, switch, or access point. It may also be possible to multi-hop over several gateway devices to connect to the auxiliary computing device 10 and to provide auxiliary processing if the additional latency incurred is tolerable/schedule-able within the executing application. In other cases, ad-hoc connections may be formed directly between the mobile device 20 and the auxiliary computing device 10.

One example of when an ad-hoc connection may be established is when the mobile device 20 and the auxiliary computing device 10 are in close proximity. When the mobile device 20 and the auxiliary computing device 10 are in close proximity communications between the devices may be accomplished via a personal area network. A personal area network may include networks having relatively small ranges, such as within a room, a work area, arms reach, or on one's person. A smart watch offloading processing to a phone is an example of offloading within a personal area network.

As part of the mobile device 20 connecting the auxiliary computing device 10 via the network connection 22 in block 706, the mobile device 20 may make some initial queries or readings of the auxiliary computing device 10 and the network connection 22 to determine properties of each. These properties may include processing capabilities of the auxiliary computing device 10, and bandwidth and signal strength of the network connection 22. Expected performance may be calculated using one or more of these properties.

In block 708, the mobile device may implement the CAL 302 and the virtual CPU 304 for use when the mobile device 20 offloads processing and/or memory tasks to the auxiliary computing device 10. In block 710 the mobile device 20 may request and receive information from the auxiliary computing device 10. The information requested may be taken into account by the mobile device 20 when offloading tasks. Thus, the information may include properties and availabilities of the auxiliary computing device 10, such as its computing capabilities, computing resources, and computing resource availability, as well as trends or gradients in those properties (e.g., increasing or decreasing availability). Examples of capabilities may include general computing specifications of the auxiliary computing device 10, like available CPU cores, frequency of the available CPU cores, RAM, software services and software libraries. Resource availability may be an indication of the capabilities that may be dedicated to the tasks provided by the mobile device 20, which in various embodiments may be all or some of the capabilities. Gradients or trends in capabilities may be based on recorded information of historical performance of the auxiliary computing device 10. Such historical performance may be generally for all tasks performed by the auxiliary computing device 10.

Alternatively, gradients may include information concerning a subset of tasks performed by the auxiliary computing device 10. The subsets may include tasks of a certain type, tasks related to a certain process or program, tasks executed while having a certain resource available, or tasks executed while also executing tasks from other mobile devices 20. The gradients may also be related to real-time information, such as information relating to recently executed or still processing tasks.

Gradients may also take into account the success of offloading the tasks. Such measures may include whether the results of the offloaded tasks were received in time, whether the results were discarded because they were not received in time, whether the results were duplicates and were no longer useful, and whether the results were received at all.

Also as part of block 710, the mobile device 20 may monitor the properties of the network connection 22, for example, bandwidth, latency, signal quality, and signal strength. The mobile device 20 may monitor these network connection properties in order to calculate a gradient in the link quality between the mobile device 20 and the auxiliary computing device 10. The gradient may be determined by tracking the signal strength and/or successful scheduling (results of offloaded processes arrive to the mobile device 20 in time). As the mobile device 20 approaches the auxiliary computing device 10, multiple or continuous sampling may indicate that the signal is trending stronger. A positive gradient/trend may prompt the mobile device 20 to schedule more or more complex processes to offload and make use of more resources of the auxiliary computing device 10. Conversely, as the mobile device 20 moves way from the auxiliary computing device 10 the signal may decay. A signal decaying gradient/trend may prompt the mobile device 20 to weakly schedule processes to offload and make used of the auxiliary computing device 10 resources, expecting that at some point the mobile device 20 may have to terminate offloading due to signal loss. Alternatively, the auxiliary computing device 10 may be monitoring the signal strength or link quality and calculating gradients in the link quality between the mobile device 20 and the auxiliary computing device 10 that it may report to the mobile device 20 in response to the request for information in block 710.

Each of the auxiliary computing device 10 and the mobile device 20 may be assigned a device signature based on their respective device properties and/or the network connection properties, such as the ones listed above. The device signature may identify each device and provide other devices with information about the device having the device signature. The device signature may change over time depending on the change in the properties used to assign the device signature.

In block 712, the mobile device 20 may evaluate the tasks to be performed. This evaluation may include determining whether to offload the tasks for processing by the auxiliary computing device 10 or to process the tasks onboard the mobile device 20. Each task may also be assigned a task signature. Evaluation of the tasks and task signatures will be described in greater detail below. When, as a result of evaluating the tasks, the mobile device 20 determines to send the tasks to the auxiliary computing device 10, the mobile device 20 may offload the tasks to the auxiliary computing device 10 in block 714. The mobile device 20 may be equipped to concurrently offload multiple tasks to the same or different auxiliary computing devices 10. In block 716 the mobile device 20 may receive the results of the execution of the offloaded tasks from the auxiliary computing device 10. The mobile device 20 may be equipped to concurrently receive multiple results from the same or different auxiliary computing devices 10. In block 718 the mobile device 20 may assemble the results received from the auxiliary computing device 10. The mobile device 20 may use these results either in isolation, or in conjunction with results from tasks executed onboard the mobile device 20. Alternatively, when the mobile device determines in block 712 that the tasks are to remain onboard and be executed by the mobile device 20, the mobile device 20 may execute the tasks and assemble the results into a finished result (e.g., a displayed image) in block 718.

With the assembled results, the mobile device 20 may generate an output incorporating the assembled results in block 720. The output may be any combination of visual, audible, or tactile output the mobile device 20 is capable of producing. For example, a visual output may be data, an image, a series of images in still or video displayed on a peripheral or integrated display of the mobile device 20. As another example, the visual output data may be displayed as a projection from a peripheral or integrated video projector of the mobile device 20. Also, an example of an audible output may include sound emitted from a peripheral or integrated speaker of the mobile device. In an embodiment of the tactile output, the mobile device 20 may produce a vibration or other haptic output, such as a change in a texture of an external surface of the mobile device 20. The tactile output may also be expressed through a peripheral device. The output may also be more data that can be used by the mobile device 20 to process further tasks and generate further outputs. The output may also be stored in the memory 206 of the mobile device 20 or transmitted to another device by the mobile device 20. The output may also include instructions or data to control a peripheral device, such as a vehicle, a robot, or a toy.

In an embodiment, after evaluating a task in block 712, the mobile device 20 may have other tasks to evaluate. Therefore, in determination block 722, the mobile device 20 may determine whether it is still connected to the auxiliary computing device 10. If the mobile device 20 is no longer connected to the auxiliary computing device 10 (i.e. determination block 722="No"), the mobile device 20 may search for the same or another auxiliary computing device 10 in block 702. As a result of losing the network connection 22 with the auxiliary computing device 10, the mobile device 10 may release the CAL 302 for the disconnected auxiliary computing device 10. In other embodiments, the mobile device 10 may retain the CAL 302 for the disconnected auxiliary computing device 10 to speed up reconnection. The determination to release or retain the CAL 302 for the disconnected auxiliary computing device 10 may be based on one or more considerations, such as whether the mobile device 10 is still connected to the network 24 over which it connected to the auxiliary computing device, elapsed time since the loss of connection, whether the mobile device 20 is still waiting or can still use pending offloaded tasks of the disconnected auxiliary computing device 10, and an ability to offload tasks to another auxiliary computing device 10. If the mobile device 20 is still connected to the auxiliary computing device 10 (i.e. determination block 722="Yes"), the mobile device 20 may request and receive information from the auxiliary computing device 10 in block 710, and evaluate the tasks in block 712. Alternatively, the mobile device 20 may return straight to evaluating the tasks in block 712 upon determining that it is still connected to the auxiliary computing device 10. This may be aided by the use of the device signatures. When determining that the mobile device 20 is still connected to the auxiliary computing device 10, the device signatures may be compared to previous device signatures. No change in the device signatures may indicate that the device and network connection properties have not changed.

Another embodiment may include that the mobile device 20 may search for another auxiliary computing device 10 regardless of whether it is still connected to the first auxiliary computing device 10. This may occur either in addition to being connected to the auxiliary computing device 10 such that the mobile device 20 may be concurrently connected to multiple auxiliary computing devices 10, or to find another auxiliary computing device 10 to replace the current one. Similarly, one auxiliary computing device 10 may be concurrently connected to multiple mobile devices 20.

The method for executing mobile coprocessing on the mobile device 700 may continue until, for example, the mobile device determines it no longer wants to offload tasks to the auxiliary computing device 10. Alternatively, the method for executing mobile coprocessing on the mobile device 700 may continue until, for example, the wireless link 22 is no longer available (either because no network 24 is available or the capability of the mobile device 20 to connect to the network 24 is disabled), or if no auxiliary device 10 is available (either because the capability of the auxiliary computing device 10 to connect to the network 24 is disabled, or the auxiliary computing device 10 denies access to the mobile device 20).

Tasks that the mobile device 20 allocates to the auxiliary computing device 10 may be latency-tolerant tasks—i.e., tasks which do not have to be accomplished immediately or can be accomplished before they are needed. This is because tasks assigned to and executed by the auxiliary computing device 10 may not be received by the mobile device 20 as quickly as a task executed by its own CPU 202 due to, for example, delays of the wireless link 22. In some instances/applications it may be possible to account for the delays and offload the tasks at a time when the data can be received by the mobile device 20 before or when it is ready for the data. In other instances/applications the mobile device 20 may delay an output by an amount of time necessary to avoid the perception of delays. These tasks may be allocated by the mobile device 20, executed by the auxiliary computing device 10, and results may be received by the mobile device 20 in real-time so that the mobile device 20 can continuously provide an output for the user.

Each task evaluated by the mobile device 20 may be assigned a task signature based on the various task properties described below. Examples of such properties may include priority, computational complexity, latency tolerance, and/or the significance or necessity of the result of the processed to task to producing the output.

Figure 8:
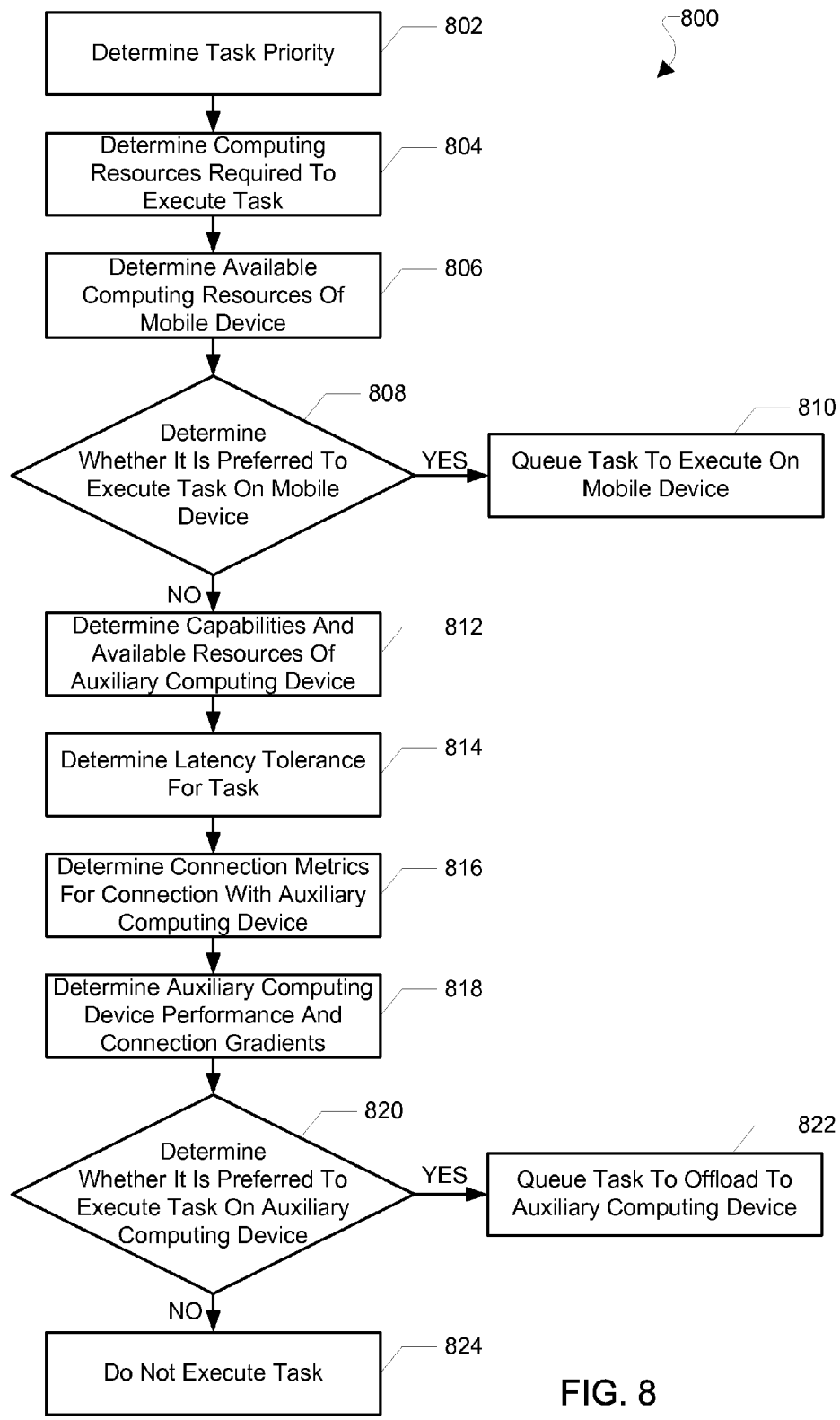
FIG. 8 is a process flow diagram illustrating an embodiment method for executing a scheduling operation with mobile coprocessing.

FIG. 8 illustrates an embodiment method for executing a scheduling operation 800 with mobile coprocessing. In one embodiment, the scheduling operation 800 may be implemented via the scheduler 28 of the mobile device 20. This scheduling operation 800 may be executed by the mobile device 20 as part of evaluating the tasks in block 712. In block 802 the mobile device 20 determines a task priority for the task. Each task may have a task priority indicative of, for example, the tasks computational complexity, a latency tolerance for the task by the related software, and/or the significance or necessity of the result of the processed task for producing the output. In an embodiment, the processing task may be divided in to nth order tasks. A 1st order task may be task responsible for a main portion of an output, or a portion of the output that is required. Other order tasks, like a 2nd or 3rd order task, may be less critical to the output. For example, a 2nd order task may be a special effect resulting from an action, where a 3rd order task may be a further refinement of the special effect to give it a smoother visual effect, a deeper bass audio effect, or a more variable tactile effect. A 3rd order task may also be related to background visuals or sounds that help enhance the user experience for the application but are not crucial to the user experience. Further order task to the nth order can be even greater refinements to the output but also even less critical. In an embodiment, the order of individual tasks or types of tasks may be predetermined by the software developer.

Another embodiment may include a runtime compiler configured to identify critical code elements. The critical code elements may be identified as the 1st order tasks which are not to be offloaded because failure to fully execute the code would cause a fatal, or unrecoverable, error. The runtime compiler may be able to scan the code and identify portions that may cause these errors. One such example may include tracing dependencies of function to other functions, determining which of the functions form the heads of the dependency trees and identifying those base functions as 1st order tasks.

In block 804, the mobile device 20 may determine the onboard computing resources that would be required to execute the task on the mobile device 20 itself. In block 806, the mobile device 20 may determine what computing resources it has available to execute the task onboard. In determination block 808, the mobile device 80 may determine whether it prefers to execute the task onboard. In determining whether to execute the task onboard, the mobile device 20 may take into account a number of allocation parameters, for example, the task priority, the required computing resources, the mobile device's available computing resources, and whether the latency of results received from auxiliary computing device 10 would be acceptable for the application output. If the mobile device 20 determines that it prefers to execute the task onboard (i.e. determination block 808="Yes"), the mobile device 20 may queue the task to execute on the mobile device 20 in block 810. Alternatively, the mobile device 20 may not have to queue the task for execution and may immediately execute the task. An example of a task that the mobile device 20 may prefer to execute onboard may be a task that if not executed in time would cause a fatal error and the software to irrecoverably malfunction. Another example may include a task that is sufficiently vital to a user experience that not executing the task in time would degrade the user experience in an unacceptable manner.

If the mobile device 20 determines that it does not prefer to execute the task on board (i.e. determination block 808="No"), in block 812 the mobile device 20 may determine the capabilities and available computing resources of the auxiliary computing device 10. In determining the capabilities and available computing resources of the auxiliary computing device 10, the mobile device 20 may use the information received from the auxiliary computing device 10 in block 710. Alternatively, the mobile device 20 may at this point request and receive information from the auxiliary computing device 10 as described in conjunction with block 710.

In block 814 the mobile device 20 may determine the latency tolerance of the task by the related software. The latency tolerance for the task may rely on a number of factors.

Such factors may include, for example, the significance or necessity of the result of the task in producing the output and the usability of the result of the task at a later time if the result is delayed beyond an expected time. In block 816, the mobile device 20 may determine the connection metrics for the connection (or wireless link) 22 with the auxiliary computing device 10. As mentioned above, the connection metrics may include, for example, signal strength, link quality, latency, bandwidth, error rates, and performance gradients of the local wireless communications link 22. In block 818, the mobile device 20 may determine the auxiliary computing device's processing gradients (e.g., trends in capacity or capabilities). As with determining the capabilities and available computing resources of the auxiliary computing device 10 in block 812, the mobile device 20 may use the information received in block 710 or may at this point request and receive information from the auxiliary computing device 10. Alternatively, the mobile device 20 may measure the performance of the auxiliary computing device 10 during a connection session and calculate the link quality and performance gradients itself.

In block 820 the mobile device 20 may determine whether it would be advantageous (e.g., in terms of power savings, processing capability and/or latency) to offload the task to the auxiliary computing device 10 for processing. In determining whether to offload the task, the mobile device 20 may take into account a number of allocation parameters, including for example: the task priority, the required computing resources, the latency tolerance for the task by the related software, the connection metrics, the computing capabilities of the auxiliary computing device, the available computing resources and the gradients of the auxiliary computing device 10. If the mobile device 20 determines that it is advantageous to offload the task (i.e. determination block 820="Yes"), the mobile device 20 may queue the task to offload to the auxiliary computing device 10 in block 822. Alternatively, the mobile device 20 may not have to queue the task for offloading and may immediately offload the task.

In some embodiments, the mobile device 20 may also queue a secondary set of the same tasks to be offloaded to another auxiliary computing device 10 (if available) in order to increase the chance of receiving a timely and complete result. Similarly, the secondary set of tasks may not be the same as the primary set of tasks offloaded to the first auxiliary computing device. Instead, the secondary set of tasks may be tasks that will produce a lower quality output than the first set of tasks but that can be completed faster. In this way, if the mobile device 20 receives the results from both sets of task, it will use the higher quality results from the first set of tasks to produce the output. But, if there is a problem with receiving the results of the first set of tasks, then the mobile device 20 may use received results from the second set of task to produce the output of lower quality than if using results from the first set of tasks, but higher quality than if not using the results received.

If the mobile device 20 determines that it does not prefer to offload the task (i.e. determination block="No"), then the mobile device 20 may avoid executing the task altogether. Examples of tasks that the mobile device 20 may avoid executing altogether may include tasks that are not essential to the running of the software, i.e. the software may properly execute without the task, and task that if not executed will not degrade the user experience in an unacceptable manner.

In an alternative embodiment of the method for executing the scheduling operation 800, the mobile device 20 may forego some or all of the determination steps by utilizing coprocessor locality, which is the tendency of a task with a certain task signature to be assigned to either an auxiliary computing device 10 or the mobile device 20 with a certain device signature. When a task with a particular task signature is assigned to either the auxiliary computing device 10 or the mobile device 20 with a particular device signature, then it is likely that tasks with a similar task signature will be assigned to the same device (i.e., auxiliary computing device 10 or mobile device 10) in the near future. Coprocessor locality allows for intelligent distribution of tasks to different devices (one of the auxiliary computing devices 10 or the mobile device 20) depending on the task signature and the past task allocation behavior. Given similar conditions task distribution can be predictable. This helps avoid computing the device signature every time a task needs to be allocated to the auxiliary computing devices 10 or the mobile device 20. Computing a device signature may involve gathering data from the auxiliary computing devices 10 or the mobile device 20 that is an additional computational overhead as well as network overhead that can be avoided.

Figure 9A:
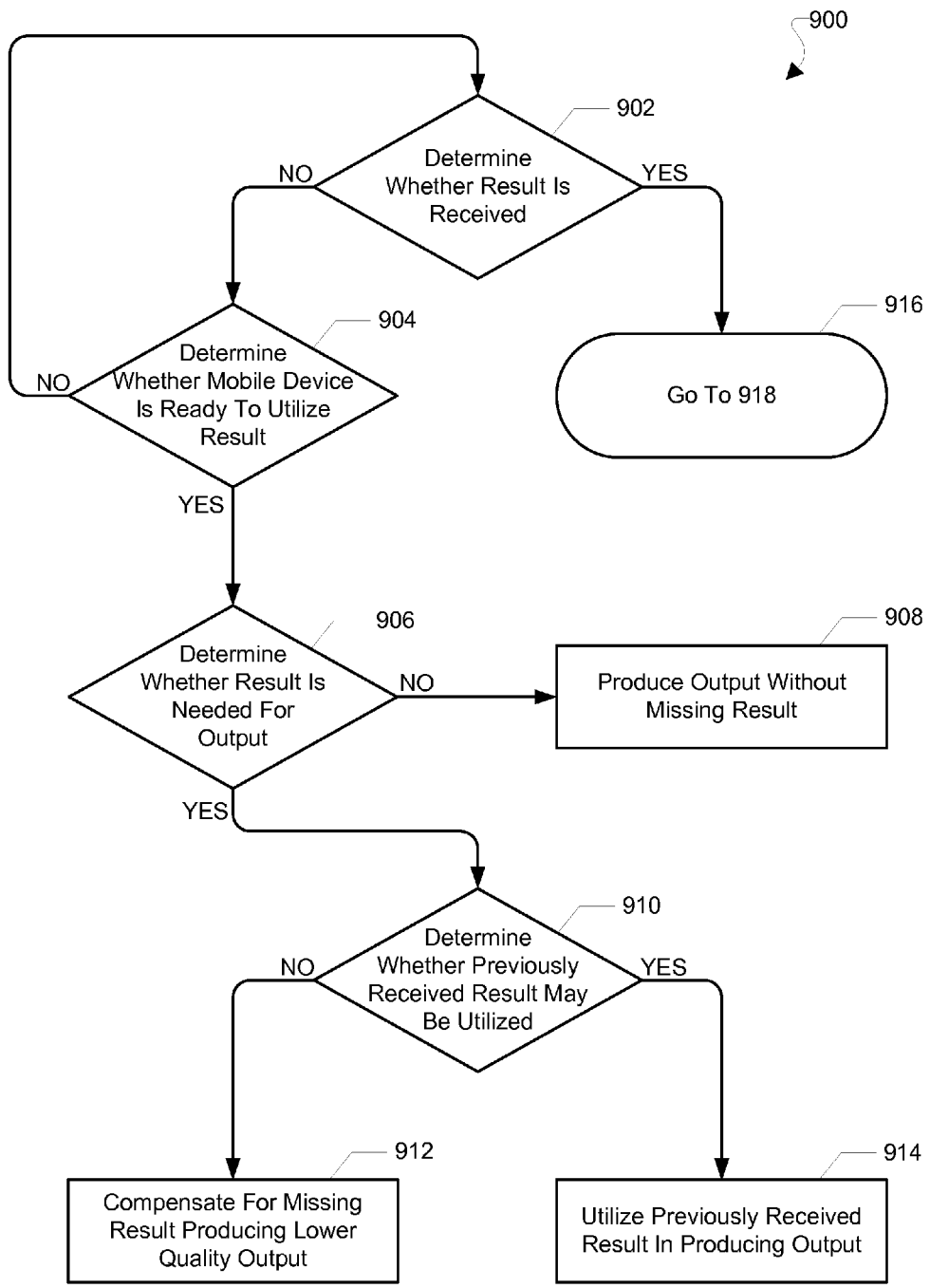
FIGS. 9A and 9B are process flow diagrams illustrating an embodiment method for executing an assembling operation with mobile coprocessing.
Figure 9B:
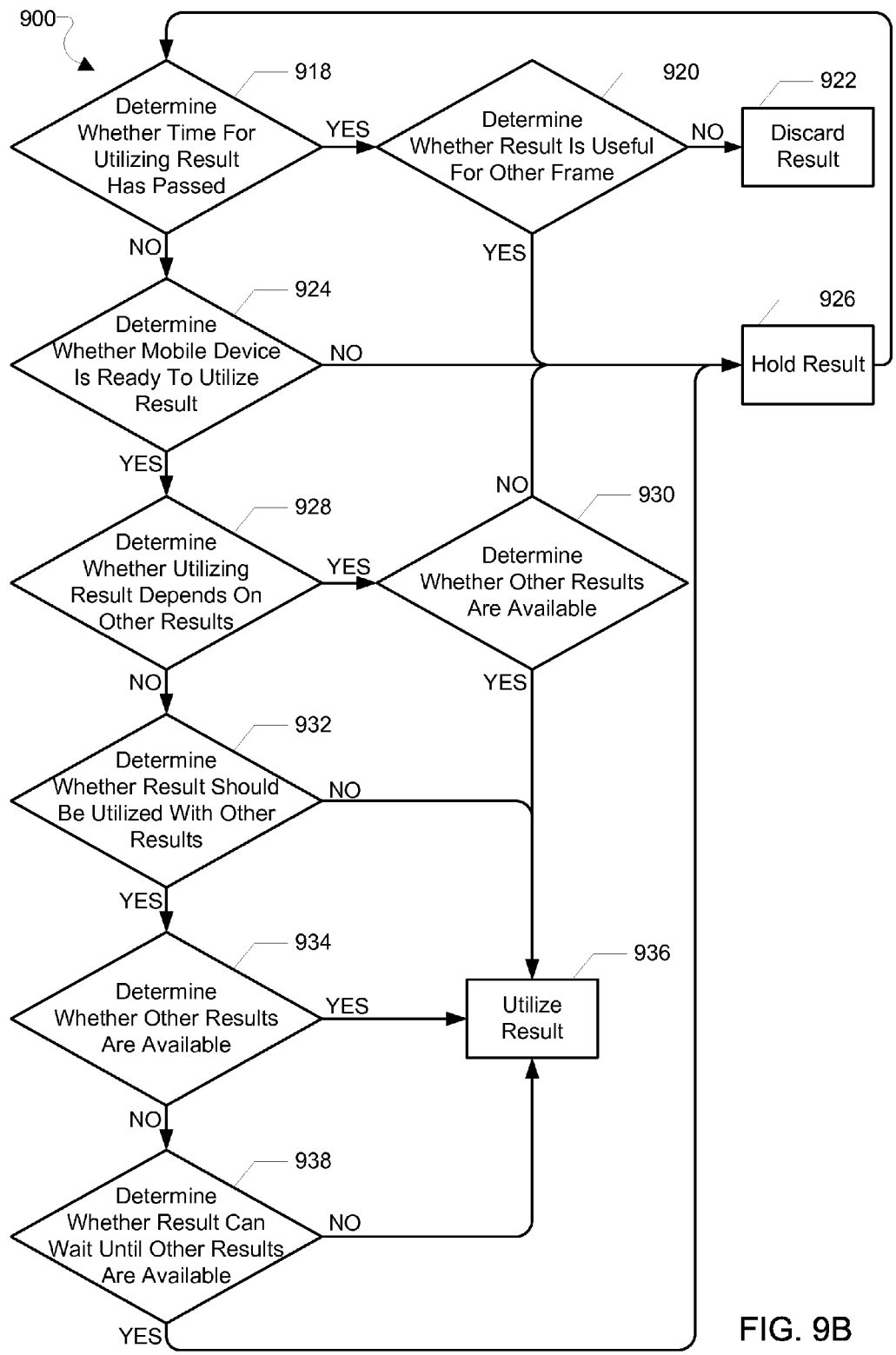
Figure 9C:
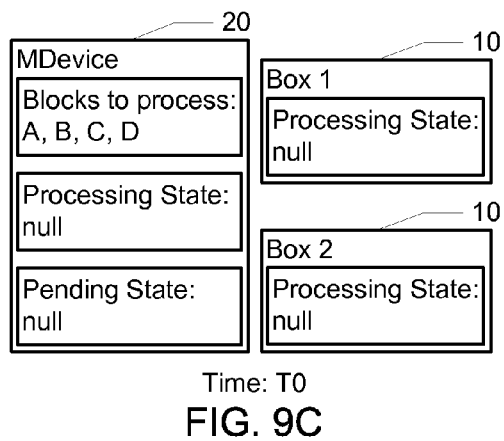
FIGS. 9C-9I are block diagrams illustrating an embodiment method for executing mobile coprocessing.

FIGS. 9A and 9B illustrate an embodiment method for executing an assembling operation 900 with mobile coprocessing. In one embodiment, the assembling operation 900 may be implemented via the assembler 30 of the mobile device 20. This assembling operation 900 may be executed by the mobile device 20 as part of assembling the results in block 718. The mobile device 20 may determine whether it has received a result of an offloaded process from the auxiliary computing device 10 for use in a process executed on the mobile device 20 in determination block 902. When the mobile device 20 has not received the result (i.e. determination block 902="No"), the mobile device 20 may determine whether it ready to utilize the result that has not been received in determination block 904. When the mobile device 20 is not ready to utilize the result that has not been received (i.e. determination block 904="No"), the mobile device 20 may return to determining whether the result has been received in determination block 902. When the mobile device 20 is ready to utilize the result that has not been received (i.e. determination block 904="Yes"), the mobile device 20 may determine whether the missing result is needed for the output of the process in determination block 906.

Whether the result is needed may be judged based on various criteria. In some instances the need for the result for a procedure may be based on maintaining the functional integrity of the process. In these cases, missing the result may cause an unrecoverable or fatal error in the process and cause a program using the process to crash or malfunction. In other instances the need for the result may arise from the desire to maintain a certain level of quality of the output of the process. In these cases, missing the result may cause the output to be incomplete or causing issues with the output such as aliasing, ghosting, stuttering, skipping, temporary freezing, repeating, blurring, blanking, buffering, static or white noise, misalignment, and incorrect coloring. When the mobile device 20 determines that it does not need the missing result for the output (i.e. determination block 906="No"), the mobile device may execute the process to produce the output without using the missing result in block 908. The output may be of reduced or lower quality than if the process were implemented using the missing result, however the output is still of sufficient quality not to require supplemental processes to augment the output. When the mobile device 20 determines that it needs the missing result for the output (i.e. determination block 906="Yes"), the mobile device 20 may determine whether a previously received result may be utilized to produce the output in determination block 910.

When the mobile device 20 determines that there is not a previously received result that may be utilized to produce the output (i.e. determination block 910="No"), the mobile device 20 may execute a process to compensate for the missing result and produce an output of reduced or lower quality than would have been produced when using the missing result in block 912. When the mobile device 20 determines that there is a previously received result that may be utilized to produce the output (i.e. determination block 910="Yes"), the mobile device 20 may utilizing the previously received result to produce the output in block 914. The output produced by utilizing the previously received result may be of greater, same, or lower quality or resolution than the output that would be produced using the missing result. The output may even be of the same quality as when there is no previously received result. However, using the previously received result may still save the mobile device 20 processing time, free up processing resources, and conserve battery power by allowing the mobile device to avoid performing the processes to produce the result.

When the mobile device 20 determines that the result is received (i.e. determination block 902="Yes"), in block 916 the method may continue to determination block 918. In determination block 918 the mobile device 20 may determine whether a time for utilizing the result has passed. If the time for utilizing the result has passed (i.e. determination block 918="Yes"), in determination block 920 the mobile device 20 may determine whether the result is useful for the current processing frame, next output frame, or future frames of either type. The mobile device 20 may have expected to have the result returned from the auxiliary computing device 10 by an expected time where the expected time is before the time the result is to be utilized. In an embodiment, the result may be useful even if it only becomes available to the mobile device after the time it was to be utilized, because the result may be utilized in a later process. If the result is determined to be still useful (i.e. determination block 920="Yes"), the mobile device 20 may hold the result in block 926 until the result can be utilized. If the result is determined to not be useful (i.e. determination block 920="No"), the mobile device 20 may discard the result in block 922.

If, on the other hand, it is determined that the time for utilizing the result has not passed (i.e. determination block 918="No"), in determination block 924 the mobile device 20 may determine whether it is ready to utilize the result. In some instances, the expected time may have a time buffer before the result is to be utilized to allow for some delays in receiving the result from the auxiliary computing device 10. It may occur that the result is received by the mobile device 20 before, at, or soon after the expected time where there is still time left before the result is to be utilized. If the result is received at a time such that it is determined that the mobile device 20 is not ready to utilize the result (i.e. determination block 924="No"), the mobile device 20 may hold the result in block 926 until the result can be utilized.

If it is determined that the mobile device 20 is ready to utilize the result (i.e. determination block 924="Yes"), in determination block 928 the mobile device 20 may determine whether utilizing the result depends on having other results, either previously utilized or to utilize concurrently. Embodiments may call for utilization of the result to depend on utilization of other results. For example, the positioning of an object on a display depends on a number of coordinates, the results represent those coordinates, and the object cannot be displayed without the full set of coordinates. Thus, if one result representing one of the coordinates is not available, then none of the results for the object can be utilized and the object cannot be displayed. If utilizing the result is dependent on the utilization of other results (i.e. determination block 928="Yes"), in determination block 930 the mobile device 20 whether the other results are available. If the other results are not available (i.e. determination block 930="No") the mobile device 20 may hold the result in block 926 until the result can be utilized. If the other results are available (i.e. determination block 930="Yes"), the mobile device 20 may utilize the result in block 936.

If utilizing the result is not dependent on the utilization of other results (i.e. determination block 928="No"), in determination block 932 the mobile device 20 may determine whether the result should be utilized with other results. In various embodiments, it may be preferred that the result be utilized after or concurrently with other results. For example, in watching a video, it is generally preferable that the video and audio portions are output synchronously. However, if one result represents the audio portion and one represents the video portion it may be more desirable to utilize one without the other than utilize neither. Therefore, if it is determined that there is no preference that the result be utilized with other results (i.e. determination block 932="No"), the mobile device 20 may utilize the result in block 936.

If the result should be utilized with other results (i.e. determination block 932="Yes"), in determination block 934 the mobile device 20 may determine whether the other results are available. If the other results are available (i.e. determination block 934="Yes"), the mobile device 20 may utilize the result in block 936. If the other results are not available (i.e. determination block 934="No"), in determination block 938 the mobile device 20 may determine whether utilizing the result can wait until the other results are available. In various embodiments, some results may be less time sensitive than others. While if a result is available the mobile device 20 may utilize it, instances may exist where the result may be utilized later instead to produce a better output. For example, a shadow effect may be represented in one result, while the shadow terrain mapping effect may be represented in another result. It may be fine to output a display of the shadow flatly on a terrain, but it may be odd and it would be more desirable to display the shadow mapped to irregularities of the terrain. Thus the shadow could be displayed, but it may be desired to delay the display of the flat shadow until it must be displayed without the mapping to the terrain, such as instances where the shadow becomes an important part of the overall display. If the mobile device 20 determines that the result can wait for other results to be available (i.e. determination block 938="Yes"), the mobile device 20 may hold the result in block 926 unlit it can be utilized. If the result cannot wait until other results are available (i.e. determination block 938="No"), the mobile device may utilize the result in block 936.

In an example situation, shown in FIGS. 9C-9I, where the mobile device 20 has a video game application that needs to processed, processing for this game needs to occur in real-time. The game targets a frame rate of 30 fps (frames per second), thus the mobile device must process and prepare each frame of rending information at a rate of 33.33 ms per frame. Assuming processing blocks A, B, C, and D, where A is required to keep the overall experience meaningful to the user. That is, without A, the game doesn't run, or the overall experience is poor. Processing blocks B, C, and D are useful to enhance the experience, but are not critical. If B, C, and D don't get done, the game is still playable, but lacks the "extra eye-candy" that could be provided by B, C, and D. For example, in a car racing game, A could be the processing for the car and it's interaction with the track. B could be debris effects, like when the car smashed into other objects on the racing track. C could be enhanced debris effects, basically more dust particles and such. D could be background effects (moving clouds, flags waving, and fans jumping the stands to the background scene).

With just A, the game is a car and the race track. Adding B provides dust and contrails. Adding C would provide high resolution dust. Adding D would make the sky move, flags that garner the track would move as if the wind was blowing, and fans in the stands would be jumping with excitement.

In this example the mobile device 20, MDevice, is connected to two auxiliary computing devices 10, Box 1 and Box 2, which don't necessarily have the same capabilities. At time T0, the initial state shown in FIG. 9C, the mobile device 20 attempts to process A, B, C, D. The blocks to process are A, B, C, D; the MDevice processing state is null; the MDevice pending state is null; the Box 1 processing state is null; and the Box 2 processing state is null.

Figure 9D:
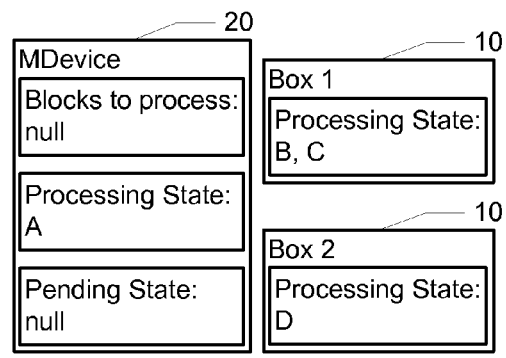

At time Tschedule in this example, shown in FIG. 9D, MDevice is aware that Box 1 and Box 2 are available with the resources required to process B, C, and D. So, MDevice offloads B and C to Box 1, and D to Box 2. At this time in this example the MDevice processing state is A; the MDevice pending state is null, the Box 1 processing state is B, C; and the Box 2 processing state is D.

Figure 9E:
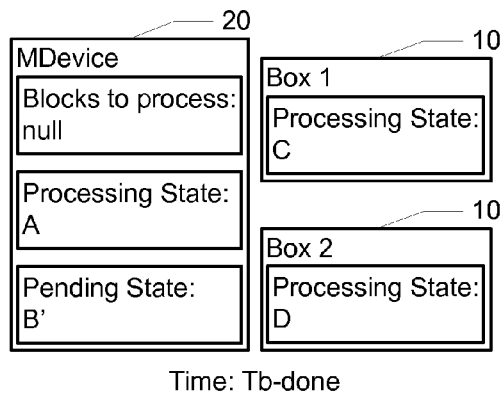

At time Tb-done, shown in FIG. 9E, Box 1 has completed processing B and has sent the results to MDevice. MDevice holds the B results (B'), until process time is available. MDevice processing state is A; the MDevice pending state is B'; the Box 1 processing state is C; and the Box 2 processing state is D.

Figure 9F:
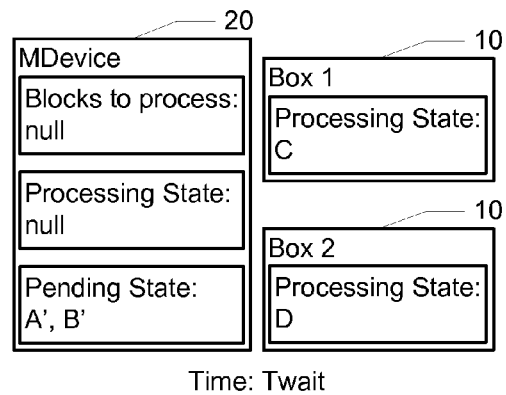

At time Twait, shown in FIG. 9F, MDevice has completed A (resulting in A') and MDevice is waiting for C and D. MDevice processing state is waiting; the MDevice pending state is A', B'; the Box 1 processing state is C; and the Box 2 processing state is D.

Figure 9G:
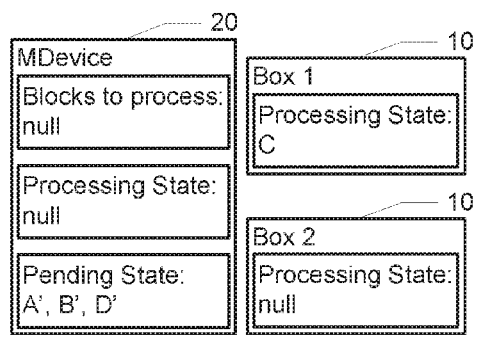

At time Td-done, shown in FIG. 9G, Box 2 has completed processing D and has sent the results D' back to MDevice. MDevice stores the results and waits for C to complete. MDevice processing state is waiting; the MDevice pending state is A', B', D'; the Box 1 processing state is C; and the Box 2 processing state is null.

Figure 9H:
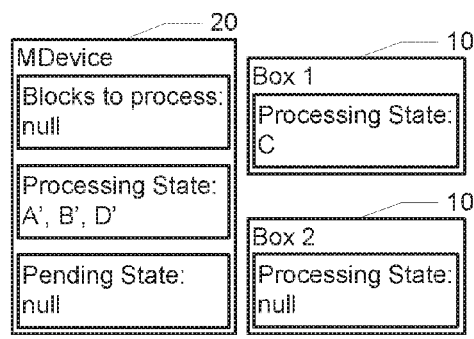

At time Tcantwait, shown in FIG. 9H, MDevice determines that it cannot wait any longer for C to complete. It moves ahead with processing what it has. Processing of results may filter which results in aggregation are useful to rendering the current scene, since not all results are useful at A', B', D' aggregation time. MDevice processing state is A', B', D'; the MDevice pending state is null; the Box 1 processing state is C; and the Box 2 processing state is null.

Figure 9I:
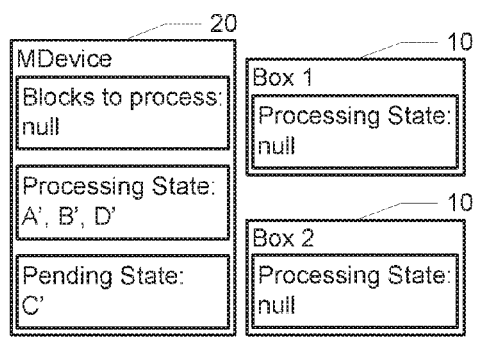

At time Tshow, shown in FIG. 9I, the aggregate results of A', B', D' are used to affect the state of the output and the users video frame is rendered. Coincidentally, Box 1 has completed C and has sent the results C' to MDevice. MDevice processing state is A', B', D'; the MDevice pending state is C'; the Box 1 processing state is null; and the Box 2 processing state is null.

MDevice determines if C' is useful for the current processing frame, next output frame, or future frames of either type for scheduling. If it is not, C' is discarded (it is possible for MDevice to discard it on late reception as well, if configured in that way). At time T0+1, MDevice may begin processing the next set of blocks.

Other example situations where the mobile device 20 may offload tasks may include photo and video processing. Complex photo editing processes may be offloaded by the mobile device 20 to alter and render large image files with high levels of detail. Similarly, video processing for quick moving scenes, scenes with drastic ranges in color and lighting, and scenes with complex sound patterns may be offloaded by the mobile device 20. Audio processing to provide directional and spatial characteristics to sounds, improved clarity, depth and tone of sounds, or sound manipulations presented to a user may also be offloaded.

Figure 10:
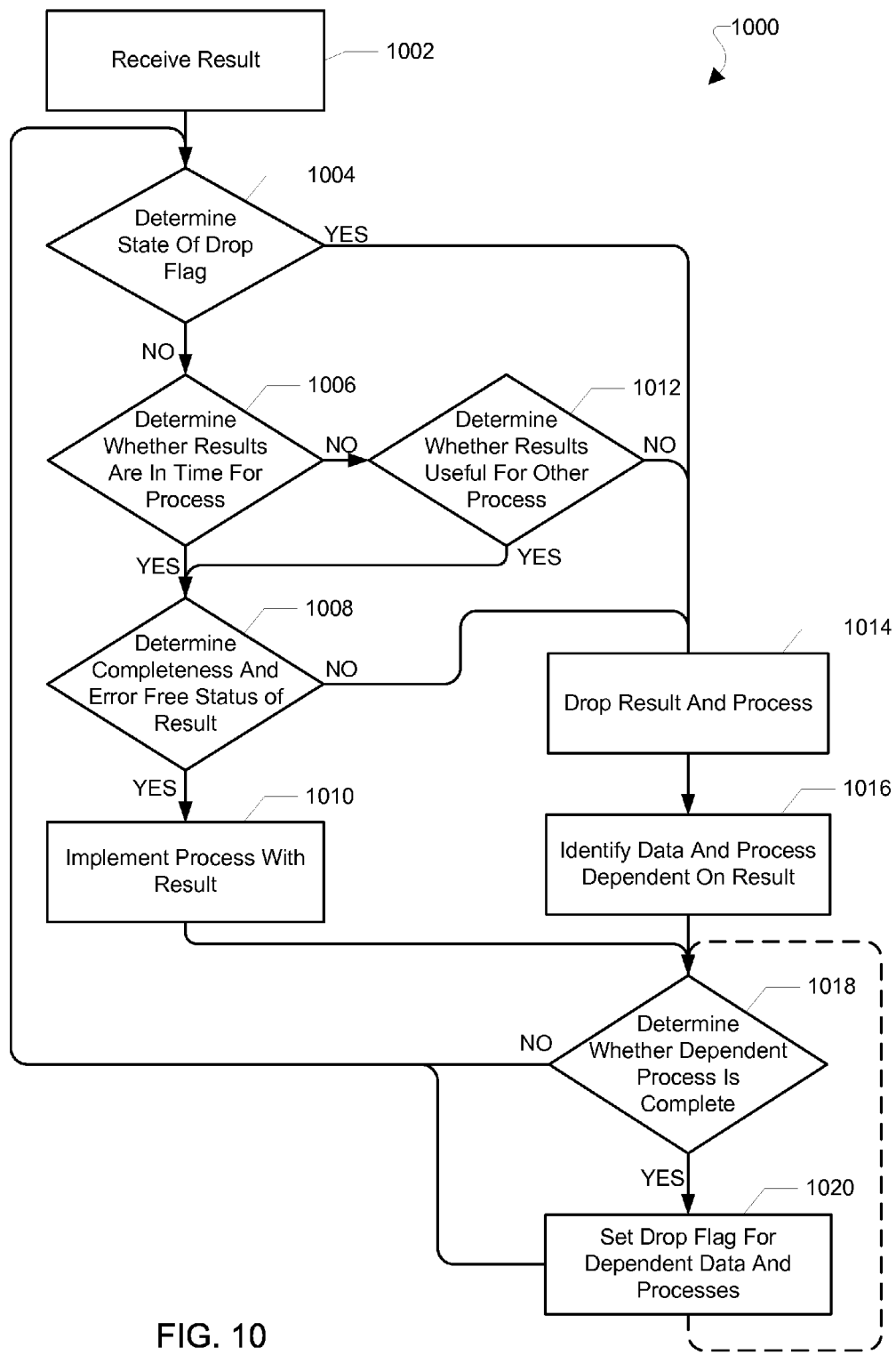
FIG. 10 is a process flow diagram illustrating an embodiment method for executing an assembling operation with mobile coprocessing.

FIG. 10 illustrates an embodiment method for executing an assembling operation 1000 with mobile coprocessing. In one embodiment, the assembling operation 1000 may be implemented via the assembler 30 of the mobile device 20. In block 1002 the mobile device 20 may receive the results of the tasks offloaded to the auxiliary computing device 10. In determination block 1004 the mobile device 20 determines the state of a drop flag associated with the result, a process related to the result, and any other related data. In one embodiment, the drop flag may be represented by a binary bit code. For example the drop flag may have two states, one state, "drop," indicating to the mobile device 20 to drop, discard, or ignore, the result, process, and/or other data, and one state, "do not drop," indicating to the mobile device 20 to retain the result, process, and/or other data. The binary code may be represented such that when the state of the drop flag is set to "0," the state is "do not drop," and when the state of the drop flag is set to "1," the state is "drop."

When the drop flag is set to "do not drop" (i.e. determination block 1004="No"), in determination block 1006 the mobile device 20 determines whether the result is in time for the process. Some processes may only be implemented when needed or desired. The need for a certain process may depend on numerous parameters, any of which alone or in combination may be determining factors of if and when a process is implemented. In various embodiments, a task may be offloaded in anticipation or in response to such determining factors being met and the result of the task may be expected to return in time to implement the process. When the result is in time for the process (i.e. determination block 1006="Yes"), in block 1008 the mobile device 20 may determine whether the result is complete and whether it is error free. The completeness and error status of the result may be such that when utilizing the result in a process, at least, there should not be any significant problems with the output. Such problems may include any degradation in the output beyond a minimum threshold. When the result is sufficiently complete and error free (i.e. determination block="Yes"), in block 1010 the mobile 20 may implement the process with the result. In some embodiments, implementation of the process with the result may include passing the result from the assembler 30 to the application processor 26 to execute the process using the result, a parameter, and/or input for the process. In determination block 1018 the mobile device 20 may determine whether the dependent process is complete as described below.

When the result is not in time for the process (i.e. determination block 1006="No"), the mobile device 20 may determine whether the result is useful for another process in block 1012. The other process may be a continuation of or the same type of process for which the result was originally intended, but scheduled to be executed at a later time. The other process may also be a different process that may use the data of the process being implemented. When the result is useful for another process (i.e. determination block 1012="Yes"), the mobile device 20 may determine whether the result is complete and whether it is error free, as described above in block 1008.

When the drop flag state is set to "drop" (i.e. determination block 1004="Yes"), the result is not in time for the processor (i.e. determination block 1006="No"), the result is not useful for another process (i.e. determination block 1012="No"), and/or the result is not sufficiently complete or error free (i.e.

determination block 1008="No"), the mobile device drops the result and process in block 1014. In block 1016 the mobile device 20 may identify other processes and data that may depend on the result to be utilized. In some embodiments, there may exist processes and data that are dependent on a result but are not the processes and data that are implemented with the result. In such instances, the process implemented with the result may be required to execute before the processes and data that are dependent on the result, otherwise the dependent processes and data may not be useful or able to be implemented.

In determination block 1018 the mobile device 20 may determine whether the dependent process is complete. When the dependent process is not complete (i.e. determination block 1018="No"), the process may return to block 1004 to determine the state of the drop flag for the dependent process. Otherwise, when the dependent process is complete (i.e. determination block 1018="Yes"), in block 1020 the mobile device 20 may set the drop flag for the dependent process to "drop" and return to block 1004 to determine the state of the drop flag for the dependent process. Determination block 1018 and block 1020 may be repeated for each dependent process identified for a result.

Figures 11, 12:
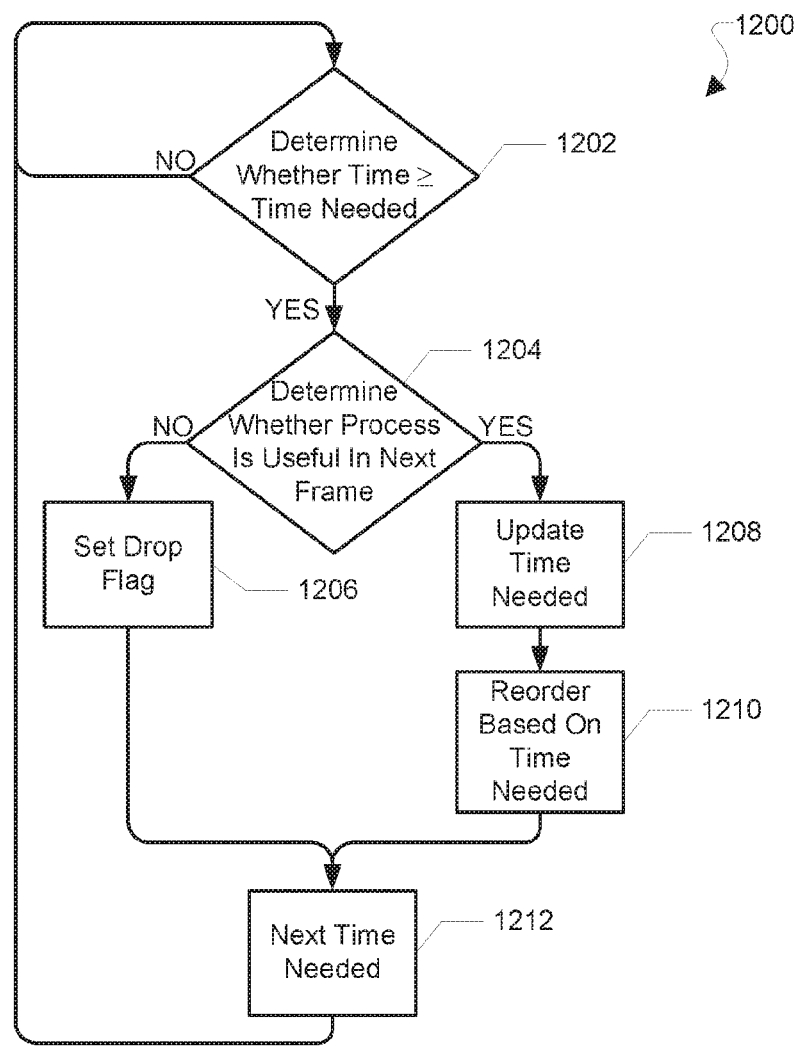
FIG. 11 is a schematic diagram illustrating an embodiment table for organizing processes in accordance with an embodiment.
FIG. 12 is a process flow diagram illustrating an embodiment method for managing the embodiment table in accordance with an embodiment.

FIG. 11 illustrates a process organization table 1100 having a drop flag state column 1102, a process column 1104, a result column 1106, a time needed column 1108, and a row 1110 containing a value for each column. In an embodiment, the process organization table 1100 may have other columns, for example, a dependent from column indicating dependence from another process. The drop flag state column 1102 may indicate the drop flag state of a process in the same row 1110. As discussed herein, the drop flag state may include a binary code, a 1 or a 0, indicating "drop" or "do not drop," respectively. It is conceived that the drop flag state may include conditional states which may be indicated in other formats, such as a binary codes with more than one bit, strings, or other code systems like octal or hexadecimal. Conditional states may indicate that a result and or process are only to be dropped when certain conditions are met. In other embodiments, a conditional state may indicate that only a process be dropped and a result kept, or vice versa.

The process column 1104 may indicate a particular process or set of processes. The result column 1106 may indicate a result or set of results. The result of the result column 1106 may be a result received from an auxiliary computing device 10 or produced by the mobile device, or an indication of an expected result from either the auxiliary computing device 10 or the mobile device 20. The time needed column 1108 may indicate a time by which the result is needed to execute the process. Each of the values in each row 1110 may be related to the other values in the same row 1110.

The process organization table 1100 may be stored in internal memory 206 of the mobile device 20. Changes to the process organization table 1100 may be implemented to update, insert, or delete individual values or entire rows from the table. FIG. 12 illustrates an embodiment method for managing the order of the rows in process organization table 1200. In determination block 1202 the mobile device 20 may compare a current time with the time needed from row 1110, where the value of the time needed in row 1110 is the closest value in time to the current time. When the value of the current time is less than or equal to the time needed in row 1110 (i.e. determination block 1202="No"), the mobile device 20 continues to compare the current time to the time needed of row 1110. Otherwise, when the value of the current is greater than the time needed in row 1110 (i.e. determination block 1202="Yes"), in determination block 1204 the mobile device 20 determines whether the process and/or result is useful for the current frame for processing, the next frame of the output, or future frames of either type.

When the process and/or result is not useful for the current frame for processing, the next frame of the output, or future frames of either type (i.e. determination block 1204="No"), in block 1206 the mobile device 20 may set the drop flag state to "drop." In some embodiments the time needed value for a row having a drop flag state="drop" may be set to a predetermined value or a null value to avoid being checked again. In block 1212 the mobile device 20 may increment rows and begin comparing the current time to the time needed value of the next row in block 1202.

When the process and/or result is useful for the current processing frame, the next output frame, or future frames of either type (i.e. determination block 1204="Yes"), in block 1208 the mobile device 20 may update the time needed value so that the row 1110 may be rechecked in the proper time for the current frame for processing, the next frame of the output, or future frames of either type. In block 1210 the mobile device 20 may reorder the rows based on the value in the time needed column 1108 such that the rows are ordered, for example, in ascending order based on the time needed values. In block 1212 the mobile device 20 may find the row with the next closest time needed value and begin comparing the current time to the time needed value of the row in block 1202.

In other embodiments, the organization table 1100 may be similarly implemented as other data structures, and the method for managing the order of the rows in process organization table 1200 may be similarly applied to the other data structures. For example, an array may be substituted for the organization table 1100, and the method may manage elements of the array. Similarly, the data structure may be any of various known arrays, lists, trees, graphs, or hashed structures. Any of the data structures may be implemented on an application by application basis, or on a system-wide basis.

Figure 13:
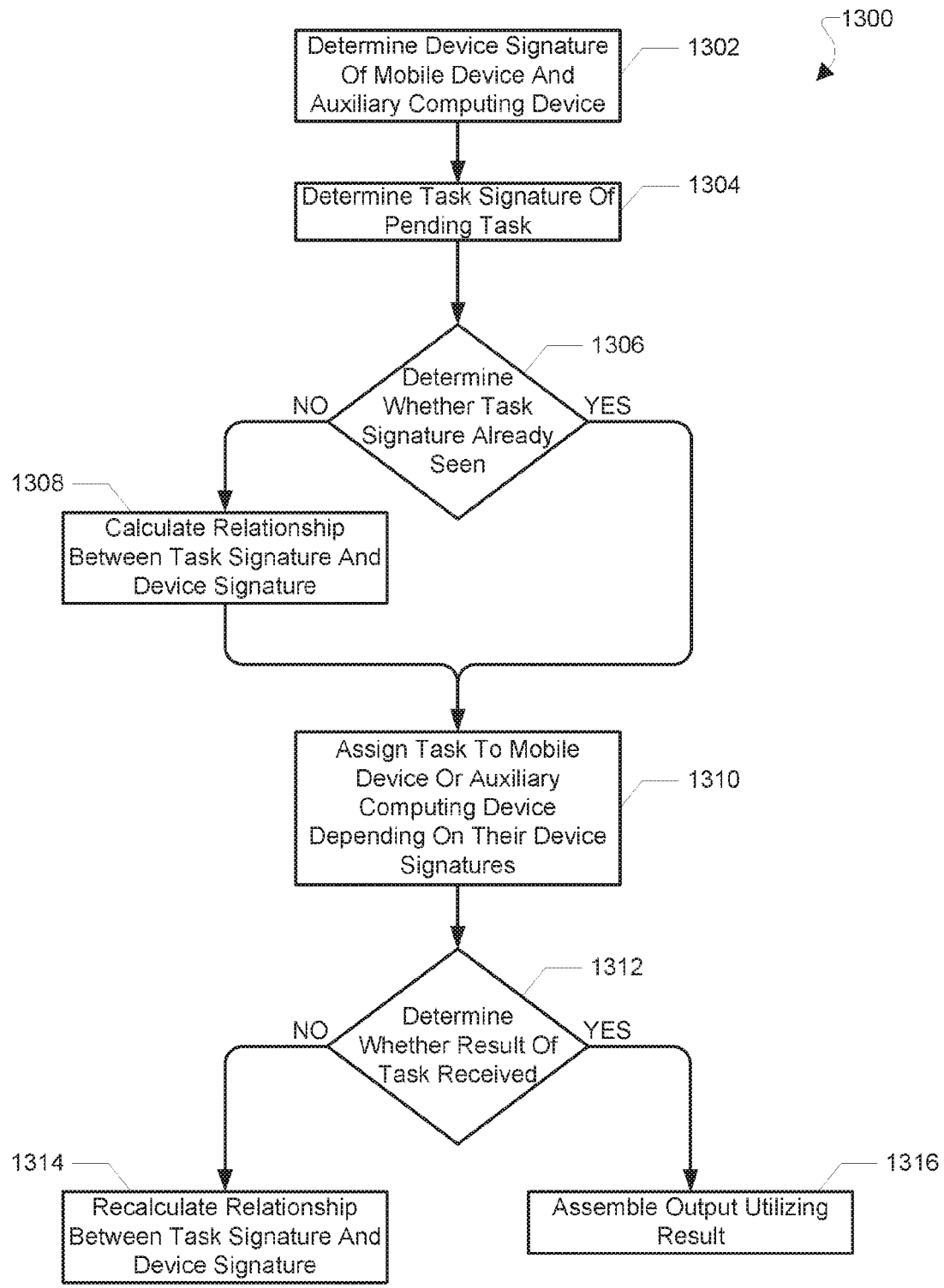
FIG. 13 is a process flow diagram illustrating an embodiment method for executing a task distribution operation with mobile coprocessing.

FIG. 13 illustrates an embodiment method for executing a task distribution method 1300 with mobile coprocessing. In block 1302 mobile device 20 may determine its own device signature and the device signature of any connected auxiliary computing devices 10. In block 1304 the mobile device 20 may determine the task signature for a process that is being prepared to be assigned for processing, either on the mobile device 20 or offloaded to and processed by the auxiliary computing device 10. The mobile device 20 may save the task signatures it assigns to different tasks for future assignment. This may reduce the overhead of determining the task signature for previously processed tasks. In determination block 1306 the mobile device 20 may determine whether it has previously seen a task signature for a pending task. When the mobile device has not previously seen the task signature (i.e. determination block 1306="No"), in block 1308 the mobile device 20 may calculate a relationship between the task signature and device signature that may help determine the device 10, 20 to which the task will be assigned. Calculating the relationship between a task signature and a device signature may be accomplished by various methods.

In block 1310 the mobile device 20 may assign the pending task to the mobile device 20 or the auxiliary computing device 10 based on their respective device signatures. The relationship between a task signature and a device signature may allow the mobile device to substitute the device signature for the task signature for the pending task. The mobile device may read the device signature associated with the pending task and assign the pending task to the device 10, 20 having the device signature associated with the pending task. The mobile device 20 may implement block 1310 when it determines that it has previously seen the task signature associated with the pending task (i.e. determination block 1306="Yes").

In determination block 1312, the mobile device 20 may determine whether a result of a task is received, either from completion of the processing of the task by the mobile device 20 or the auxiliary computing device 10. When the result of processing the task has not been received (i.e. determination block 1312="No"), the mobile device 20 may recalculate the relationship between the task signature and the device signature in block 1314. Recalculating may result in relating the task signature to a different device signature, particularly if the device signature for any of the devices 10, 20 has changed or new device signatures for previously unaccounted for devices are available. The different device signature may belong to the same device 10, 20 to which the task signature was previously related, or it may belong to a different device 10, 20. When the result of the processing the task has been received (i.e. determination block 1312="Yes"), the mobile device 20 may assemble the output of a process utilizing the result in block 1316.

Figure 14:
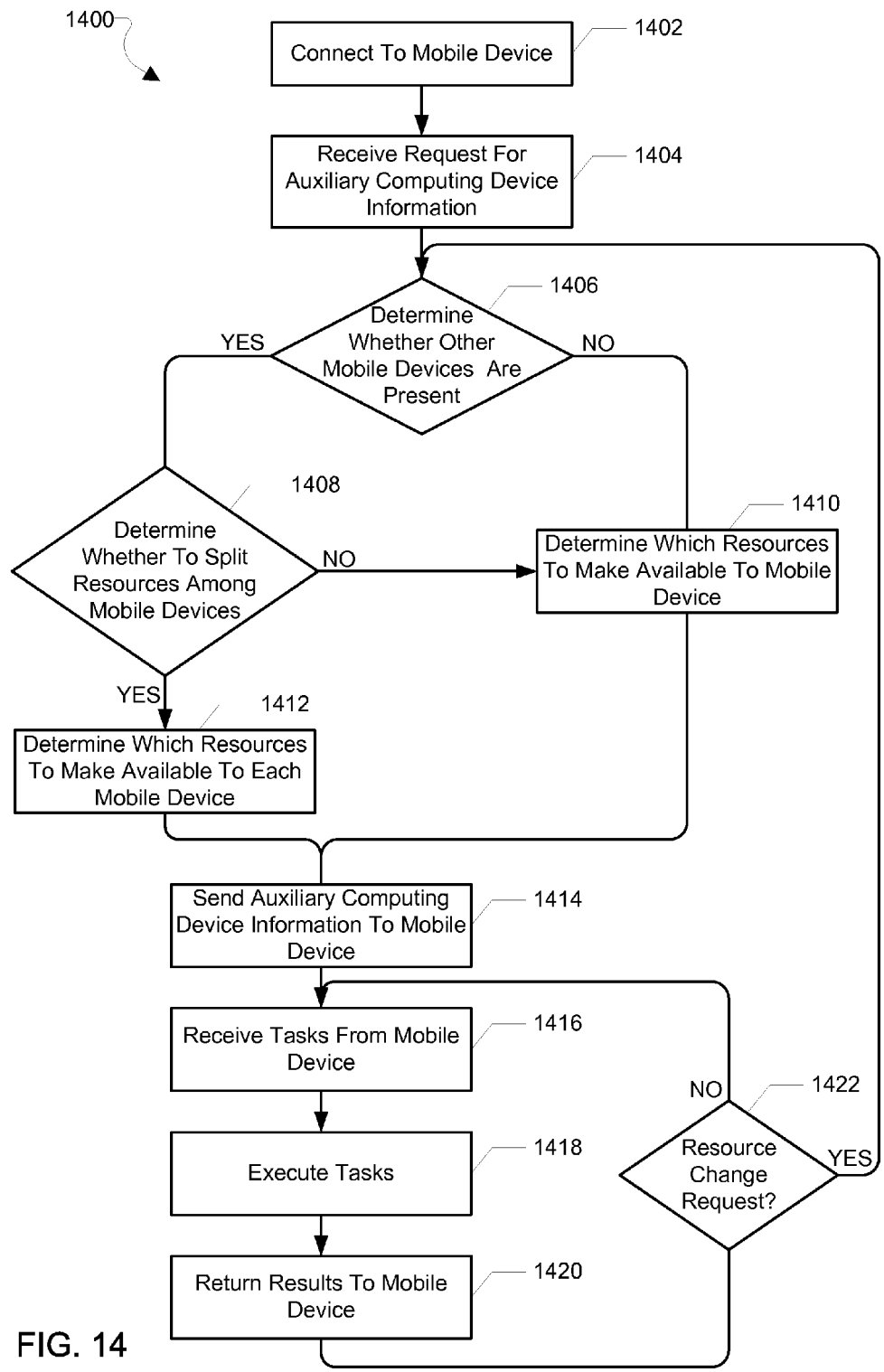
FIG. 14 is a process flow diagram illustrating an embodiment method for executing mobile coprocessing on the auxiliary computing device.

FIG. 14 illustrates an embodiment method for executing mobile coprocessing 1400 on the auxiliary computing device. In block 1402, the auxiliary computing device 10 may connect to the mobile device 20 over network 24 via wireless link 22. In block 1404 the auxiliary computing device 10 may receive the request for information from the mobile device 20. The information requested may include the properties of the auxiliary computing device 10, such as capabilities, computing resource availability, and gradients. In determination block 1406, the auxiliary computing device 10 may determine whether other mobile devices 20 are present on the network 24, or connected to the auxiliary computing device 10 via wireless link 22.

If the auxiliary computing device 10 does not detect the presence of other mobile devices 20 (i.e. determination block 1406="No"), in block 1410 the auxiliary computing device 10 determines which resources to make available to the mobile device 20. The auxiliary computing device 10 may determine whether to make all or some of its resources available to the mobile device 20. In some instances the auxiliary computing device 10 may initially make certain resources available to the mobile device 20 and later adjust the resource availability depending on the task it is allocated. If the auxiliary computing device 10 does detect the presence of other mobile devices 20 (i.e. determination block 1406="Yes"), in determination block 1408 the auxiliary computing device 10 determines whether to split its resources among the mobile devices 20. In various embodiments the need of one mobile device 20 may outweigh the need of the others and the auxiliary computing device 10 may decide to make more or all of its resources available to a particular mobile device 20. If the auxiliary computing device 10 determines not to split its resources (i.e. determination block 1408="No"), in block 1410 auxiliary computing device 10 determines which resources to make available to the mobile device 20. If auxiliary computing device 10 determines to split its resources among the mobile devices 20 (i.e. determination block 1408="Yes"), in block 1412 the auxiliary computing device 10 determines which resources to make available to each mobile device 20.

In block 1414, the auxiliary computing device 10 may return the information requested by the mobile device 20. In block 1416, the auxiliary computing device 10 may receive task from the mobile device 20, execute the tasks in block 1418, and return the results of the processed tasks to the mobile device 20 in block 1420. The auxiliary computing device 10 may continually receive tasks from the mobile device 20 until there is a resource request change. In determination block 1422 the auxiliary computing device 10 may determine whether there is a resource request change. A resource request change may come from the mobile device 20, for example, when it needs more or less resources. A resource request change may also come from the auxiliary computing device 10 due to resource load balancing or biasing towards a higher priority device or away from a lower priority device. When there is no resource request change (i.e. determination block 1422="No"), the auxiliary computing device 10 may continue to receive tasks from the mobile device 20 in block 1416. When there is a resource request change (i.e. determination block 1422="Yes"), the auxiliary computing device 20 may redistribute its resources among various mobile devices 20 in blocks 1406-1414.

In some embodiments, any portion of the process flow between any of the components may be repeated more than shown in FIGS. 7-10, 12, 13 and 14 for one of more of the processes described herein. Further some portions may occur in various orders, including occurring concurrently.

The preceding examples have demonstrated the mobile device 20 as a smartphone or like device, and the auxiliary computing device 10 as a dedicated computing device. In an embodiment, it is conceived that the auxiliary computing device 10 may be another mobile device 20. In essence, a mobile device 20 may provide auxiliary computing resources for another mobile device 20. In another embodiment, the mobile device 20 may be a remote sensor, such as one configured to sense movement, atmospheric conditions, infrared radiation, recognize objects, and the like. When an auxiliary computing device 10, in some cases another mobile device 20 like a smartphone, may provide auxiliary computing resources to the sensor mobile device 20. For example, a simple light sensor configured to control lighting may be configured to simply turn lights on and off based on its readings, but it may also be configured to make more subtle lighting changes when provided with more computing resources. In such instances the light sensor may be able to offload calculations for determining light intensity and direction, and determine to set lighting level between full on and off, or vary the lighting in different areas based on the results received. In another example, a camera may be mounted near a doorway and may take photos of those who approach the door or press the door bell. Yet, when connected to an auxiliary computing device 10, the camera may offload the pictures and recognition tasks to identify the person at the door and use the results to permit or deny entry. In another embodiment a device, such as a wearable device like a watch or head-worn device, with a microphone or a camera may offload image or audio processing, like object or pattern recognition, to a more powerful device like a smart phone.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of offloading tasks from a mobile device central processing unit (CPU) to an auxiliary computing device, comprising:
    establishing a wireless communication link between the mobile device CPU and the auxiliary computing device;
    requesting, by the mobile device CPU, processing properties of the auxiliary computing device, wherein the processing properties include a gradient of a processing property of the auxiliary computing device;
    allocating, by the mobile device CPU, a first processing task to the auxiliary computing device based on processing properties of the auxiliary computing device and one or more allocation parameters;
    determining, by the mobile device CPU, whether a first result of the first processing task from the auxiliary computing device is received;
    assembling, in the mobile device CPU, the first result of the first processing task with a second result of a second processing task performed by the mobile device CPU to render an output when the first result is received;
    determining, by the mobile device CPU, whether the output needs the first result when the first result is not received;
    determining, by the mobile device CPU, whether a previously received result can be utilized to produce the output; and
    producing, by the mobile device CPU, a lower resolution version of the output when the first result is not received, the first result is needed to produce the output, and no previously received result may be utilized to produce the output.

2. The method of claim 1, further comprising:
    determining, by the mobile device CPU, one or more communication link metrics of the wireless communication link,
    wherein the allocation parameters include the communication link metrics.

3. The method of claim 2, wherein the communication link metrics comprise one or more of a communication link quality, strength, and latency.

4. The method of claim 1, further comprising:
    assigning, by the mobile device CPU, a task priority to the first processing task based on one or more of a processing task latency tolerance, computational complexity, and significance to the output, wherein the allocation parameters include the task priority; and
    offloading, by the mobile device CPU, the first processing task to the auxiliary computing device.

5. The method of claim 4, further comprising concurrently offloading, by the mobile device CPU, the second processing task to the auxiliary computing device or another auxiliary computing device during offloading the first processing task.

6. The method of claim 1, wherein the processing properties of the auxiliary computing device further comprise one or more of computing capabilities and computing resource availability, and
    wherein the allocation parameters include the processing properties of the auxiliary computing device.

7. The method of claim 1, further comprising dynamically reallocating, by the mobile device CPU, the first processing task based on changes in the allocation parameters.

8. The method of claim 1, further comprising creating, by the mobile device CPU, an abstraction layer configured to enable allocating the first processing task between the mobile device CPU and the auxiliary computing device.

9. The method of claim 1, wherein assembling the first result of the first processing task with the second result of the second processing task to render the output, comprises:
receiving, by the mobile device CPU, the first result of the first processing task from the auxiliary computing device;
determining, by the mobile device CPU, whether a time for utilizing the first result as part of the output has passed;
determining, by the mobile device CPU, whether the first result is useful for a current processing frame or next output frame;
holding, by the mobile device CPU, the first result when the time for utilizing the first result as part of the output has passed and the first result is useful for the current processing frame or the next output frame; and
discarding, by the mobile device CPU, the first result when the time for utilizing the first result as part of the output has passed and the first result is not useful for the current processing frame or the next output frame.

10. The method of claim 1, wherein assembling the first result of the first processing task with the second result of the second processing task to render the output, comprises:
receiving, by the mobile device CPU, the first result of the first processing task from the auxiliary computing device;
determining, by the mobile device CPU, whether the mobile device CPU is ready to utilize the first result as part of the output; and
holding, by the mobile device CPU, the first result before the mobile device CPU is ready to utilize the first result as part of the output.

11. The method of claim 1, wherein assembling the first result of the first processing task with the second result of the second processing task to render the output, comprises:
receiving, by the mobile device CPU, the first result of the first processing task from the auxiliary computing device;
determining, by the mobile device CPU, whether utilizing the first result as part of the output is dependent on a third result;
determining, by the mobile device CPU, whether the third result is available;
holding, by the mobile device CPU, the first result when utilizing the first result as part of the output is dependent on the third result and before the third result is available; and
utilizing, by the mobile device CPU, the first result as part of the output when utilizing the first result as part of the output is dependent on the third result and the third result is available.

12. The method of claim 1, wherein assembling the first result of the first processing task with the second result of the second processing task to render the output, comprises:
determining, by the mobile device CPU, whether utilizing the first result as part of the output should be utilized with a third result;
determining, by the mobile device CPU, whether the third result is available;
utilizing, by the mobile device CPU, the first result as part of the output when utilizing the first result as part of the output should be utilized with the third result and the third result is available;
determining, by the mobile device CPU, whether utilizing the first result as part of the output can wait for when the third result is available;
holding, by the mobile device CPU, the first result when utilizing the first result as part of the output should be utilized with the third result, before the third result is available, and when utilizing the first result as part of the output can wait to be utilized for when the third result is available; and
utilizing, by the mobile device CPU, the first result as part of the output when utilizing the first result as part of the output should be utilized with the third result, before the third result is available, and when utilizing the first result as part of the output cannot wait to be utilized for when the third result is available.

13. The method of claim 1, further comprising:
receiving, by the auxiliary computing device, a request for the processing properties of the auxiliary computing device from the mobile device CPU;
determining, by the auxiliary computing device, computing resources to make available to the mobile device CPU;
sending, by the auxiliary computing device, the processing properties of the auxiliary computing device to the mobile device CPU;
receiving, by the auxiliary computing device, the first processing task from the from the mobile device CPU;
performing, by the auxiliary computing device, the first processing task; and
returning, by the auxiliary computing device, the first result of the first processing task to the mobile device CPU.

14. The method of claim 1, wherein the wireless communication link is established on a picocell or femtocell of a cellular network.

15. The method of claim 1, further comprising transferring data over the wireless communication link, wherein transferring the data is accomplished by one of asymmetrical transfer, compressed transfer, and encrypted data transfer.

16. A mobile device, comprising:
a central processing unit (CPU) configured with processor-executable instructions to perform operations comprising:
establishing a wireless communication link between the CPU and an auxiliary computing device;
requesting, by the CPU, processing properties of the auxiliary computing device, wherein the processing properties include a gradient of a processing property of the auxiliary computing device;
allocating, by the CPU, a first processing task to the auxiliary computing device based on processing properties of the auxiliary computing device and one or more allocation parameters;
determining, by the CPU, whether a first result of the first processing task from the auxiliary computing device is received;
assembling, in the CPU, the first result of the first processing task with a second result of a second processing task performed by the mobile device CPU to render an output when the first result is received;
determining, by the CPU, whether the output needs the first result when the first result is not received;
determining, by the CPU, whether a previously received result can be utilized to produce the output; and
producing, by the CPU, a lower resolution version of the output when the first result is not received, the first result is needed to produce the output, and no previously received result may be utilized to produce the output.

17. The mobile device of claim 16, wherein the CPU is configured with processor-executable instructions to perform operations further comprising determining one or more communication link metrics of the wireless communication link, and
wherein the allocation parameters include the communication link metrics.

18. The mobile device of claim 17, wherein the communication link metrics comprise one or more of a communication link quality, strength, and latency.

19. The mobile device of claim 16, wherein the CPU is configured with processor-executable instructions to perform operations further comprising:
assigning a task priority to the first processing task based on one or more of a processing task latency tolerance, computational complexity, and significance to the output, wherein the allocation parameters include the task priority; and
offloading the first processing task to the auxiliary computing device.

20. The mobile device of claim 19, wherein the CPU is configured with processor-executable instructions to perform operations further comprising concurrently offloading the second processing task to the auxiliary computing device or another auxiliary computing device during offloading the first processing task.

21. The mobile device of claim 16, wherein the processing properties of the auxiliary computing device further comprise one or more of computing capabilities and computing resource availability, and
wherein the allocation parameters include the processing properties of the auxiliary computing device.

22. The mobile device of claim 16, wherein the CPU is configured with processor-executable instructions to perform operations further comprising dynamically reallocating the first processing task based on changes in the allocation parameters.

23. The mobile device of claim 16, wherein the CPU is configured with processor-executable instructions to perform operations further comprising creating an abstraction layer configured to enable allocating the first processing task between the mobile device CPU and the auxiliary computing device.

24. The mobile device of claim 16, wherein the CPU is configured with processor-executable instructions to perform operations such that assembling the first result of the first processing task with the second result of the second processing task to render the output, comprises:
receiving the first result of the first processing task from the auxiliary computing device;
determining whether a time for utilizing the first result as part of the output has passed;
determining whether the first result is useful for a current processing frame or next output frame;
holding the first result when the time for utilizing the first result as part of the output has passed and the first result is useful for the current processing frame or the next output frame; and
discarding the first result when the time for utilizing the first result as part of the output has passed and the first result is not useful for the current processing frame or the next output frame.

25. The mobile device of claim 16, wherein the CPU is configured with processor-executable instructions to perform operations such that assembling the first result of the first processing task with the second result of the second processing task to render the output, comprises:
receiving the first result of the first processing task from the auxiliary computing device;
determining whether the CPU is ready to utilize the first result as part of the output; and
holding the first result before the CPU is ready to utilize the first result as part of the output.

26. The mobile device of claim 16, wherein the CPU is configured with processor-executable instructions to perform operations such that assembling the first result of the first processing task with the second result of the second processing task to render the output, comprises:
receiving the first result of the first processing task from the auxiliary computing device;
determining whether utilizing the first result as part of the output is dependent on a third result;
determining whether the third result is available;
holding the first result when utilizing the first result as part of the output is dependent on the third result and before the third result is available; and
utilizing the first result as part of the output when utilizing the first result as part of the output is dependent on the third result and the third result is available.

27. The mobile device of claim 16, wherein the CPU is configured with processor-executable instructions to perform operations such that assembling the first result of the first processing task with the second result of the second processing task to render the output, comprises:
determining whether utilizing the first result as part of the output should be utilized with a third result;
determining whether the third result is available;
utilizing the first result as part of the output when utilizing the first result as part of the output should be utilized with the third result and the third result is available;
determining whether utilizing the first result as part of the output can wait for when the third result is available;
holding the first result when utilizing the first result as part of the output should be utilized with the third result, before the third result is available, and when utilizing the first result as part of the output can wait to be utilized for when the third result is available; and
utilizing the first result as part of the output when utilizing the first result as part of the output should be utilized with the third result, before the third result is available, and when utilizing the first result as part of the output cannot wait to be utilized for when the third result is available.

28. The mobile device of claim 16, wherein the wireless communication link is established on a picocell or femtocell of a cellular network.

29. The mobile device of claim 16, wherein the CPU is configured with processor-executable instructions to perform operations further comprising transferring data over the wireless communication link, wherein transferring the data is accomplished by one of asymmetrical transfer, compressed transfer, and encrypted data transfer.

30. A system, comprising:
an auxiliary computing device; and
a mobile device comprising:
a mobile device central processing unit (CPU) configured with processor-executable instructions to perform operations comprising:
establishing a wireless communication link between the mobile device CPU and the auxiliary computing device;
requesting, by the mobile device CPU, processing properties of the auxiliary computing device, wherein the processing properties include a gradient of a processing property of the auxiliary computing device;

allocating, by the mobile device CPU, a first processing task to the auxiliary computing device based on processing properties of the auxiliary computing device and one or more allocation parameters;

determining, by the mobile device CPU, whether a first result of the first processing task from the auxiliary computing device is received;

assembling, in the mobile device CPU, the first result of the first processing task with a second result of a second processing task performed by the mobile device CPU to render an output when the first result is received;

determining, by the mobile device CPU, whether the output needs the first result when the first result is not receive;

determining, by the mobile device CPU, whether a previously received result can be utilized to produce the output; and producing, by the mobile device CPU, a lower resolution version of the output when the first result is not received, the first result is needed to produce the output, and no previously received result may be utilized to produce the output, wherein the auxiliary computing device comprises an auxiliary computing device processor configured with processor-executable instructions to perform operations comprising:

receiving, by the auxiliary computing device, a request for the processing properties of the auxiliary computing device from the mobile device CPU;

determining, by the auxiliary computing device, computing resources to make available to the mobile device CPU;

sending, by the auxiliary computing device, the processing properties of the auxiliary computing device to the mobile device CPU;

receiving, by the auxiliary computing device, the first processing task from the from the mobile device CPU;

performing, by the auxiliary computing device, the first processing task; and returning, by the auxiliary computing device, the first result of the first processing task to the mobile device CPU.

31. A mobile device, comprising:

means for establishing a wireless communication link between the mobile device and an auxiliary computing device;

means for requesting processing properties of the auxiliary computing device, wherein the processing properties include a gradient of a processing property of the auxiliary computing device;

means for allocating a first processing task to the auxiliary computing device based on processing properties of the auxiliary computing device and one or more allocation parameters;

means for determining whether a first result of the first processing task from the auxiliary computing device is received;

means for assembling the first result of the first processing task with a second result of a second processing task performed by the mobile device to render an output when the first result is received;

means for determining whether the output needs the first result when the first result is not received;

means for determining whether a previously received result can be utilized to produce the output; and means for producing a lower resolution version of the output when the first result is not received, the first result is needed to produce the output, and no previously received result may be utilized to produce the output.

32. The mobile device of claim 31, further comprising:
means for determining one or more communication link metrics of the wireless communication link,
wherein the allocation parameters include the communication link metrics.

33. The mobile device of claim 32, wherein the communication link metrics comprise one or more of a communication link quality, strength, and latency.

34. The mobile device of claim 31, further comprising:
means for assigning a task priority to the first processing task based on one or more of a processing task latency tolerance, computational complexity, and significance to the output, wherein the allocation parameters include the task priority; and
means for offloading the first processing task to the auxiliary computing device.

35. The mobile device of claim 34, further comprising means for concurrently offloading the second processing task to the auxiliary computing device or another auxiliary computing device during offloading the first processing task.

36. The mobile device of claim 31, wherein the processing properties of the auxiliary computing device further comprise one or more of computing capabilities and computing resource availability, and
wherein the allocation parameters include the processing properties of the auxiliary computing device.

37. The mobile device of claim 31, further comprising means for dynamically reallocating the first processing task based on changes in the allocation parameters.

38. The mobile device of claim 31, further comprising means for creating an abstraction layer configured to enable allocating the first processing task between the mobile device and the auxiliary computing device.

39. The mobile device of claim 31, wherein means for assembling the first result of the first processing task with the second result of the second processing task to render the output comprises:
means for receiving the first result of the first processing task from the auxiliary computing device;
means for determining whether a time for utilizing the first result as part of the output has passed;
means for determining whether the first result is useful for a current processing frame or next output frame;
means for holding the first result when the time for utilizing the first result as part of the output has passed and the first result is useful for the current processing frame or the next output frame; and
means for discarding the first result when the time for utilizing the first result as part of the output has passed and the first result is not useful for the current processing frame or the next output frame.

40. The mobile device of claim 31, wherein means for assembling the first result of the first processing task with the second result of the second processing task to render the output comprises:
means for receiving the first result of the first processing task from the auxiliary computing device;
means for determining whether the mobile device is ready to utilize the first result as part of the output; and
means for holding the first result before the mobile device is ready to utilize the first result as part of the output.

41. The mobile device of claim 31, wherein means for assembling the first result of the first processing task with the second result of the second processing task to render the output comprises:
 means for receiving the first result of the first processing task from the auxiliary computing device;
 means for determining whether utilizing the first result as part of the output is dependent on a third result;
 means for determining whether the third result is available;
 means for holding the first result when utilizing the first result as part of the output is dependent on the third result and before the third result is available; and
 means for utilizing the first result as part of the output when utilizing the first result as part of the output is dependent on the third result and the third result is available.

42. The mobile device of claim 31, wherein means for assembling the first result of the first processing task with the second result of the second processing task to render the output comprises:
 means for determining whether utilizing the first result as part of the output should be utilized with a third result;
 means for determining whether the third result is available;
 means for utilizing the first result as part of the output when utilizing the first result as part of the output should be utilized with the third result and the third result is available;
 means for determining whether utilizing the first result as part of the output can wait for when the third result is available;
 means for holding the first result when utilizing the first result as part of the output should be utilized with the third result, before the third result is available, and when utilizing the first result as part of the output can wait to be utilized for when the third result is available; and
 means for utilizing the first result as part of the output when utilizing the first result as part of the output should be utilized with the third result, before the third result is available, and when utilizing the first result as part of the output cannot wait to be utilized for when the third result is available.

43. The mobile device of claim 31, wherein the wireless communication link is established on a picocell or femtocell of a cellular network.

44. The mobile device of claim 31, further comprising means for transferring data over the wireless communication link by one of asymmetrical transfer, compressed transfer, and encrypted data transfer.

45. A system, comprising:
 an auxiliary computing device; and
 a mobile device comprising:
  means for establishing a wireless communication link between the mobile device and the auxiliary computing device;
  means for requesting processing properties of the auxiliary computing device, wherein the processing properties include a gradient of a processing property of the auxiliary computing device;
  means for allocating a first processing task to the auxiliary computing device based on processing properties of the auxiliary computing device and one or more allocation parameters;
  means for determining whether a first result of the first processing task from the auxiliary computing device is received;
  means for assembling the first result of the first processing task with a second result of a second processing task performed by the mobile device to render an output when the first result is received;
  means for determining whether the output needs the first result when the first result is not received;
  means for determining whether a previously received result can be utilized to produce the output; and
  means for producing a lower resolution version of the output when the first result is not received, the first result is needed to produce the output, and no previously received result may be utilized to produce the output,
 wherein the auxiliary computing device comprises:
  means for receiving a request for the processing properties of the auxiliary computing device from the mobile device;
  means for determining computing resources to make available to the mobile device;
  means for sending the processing properties of the auxiliary computing device to the mobile device;
  means for receiving the first processing task from the from the mobile device;
  means for performing the first processing task; and
  means for returning the first result of the first processing task to the mobile device.

46. A non-transitory processor-readable medium having stored thereon processor-executable software instructions configured to cause a mobile device central processing unit (CPU) to perform operations comprising:
 establishing a wireless communication link between the mobile device CPU and an auxiliary computing device;
 requesting processing properties of the auxiliary computing device, wherein the processing properties include a gradient of a processing property of the auxiliary computing device;
 allocating a first processing task to the auxiliary computing device based on processing properties of the auxiliary computing device and one or more allocation parameters;
 determining whether a first result of the first processing task from the auxiliary computing device is received;
 assembling the first result of the first processing task with a second result of a second processing task performed by the mobile device CPU to render an output when the first result is received;
 determining whether the output needs the first result when the first result is not received;
 determining whether a previously received result can be utilized to produce the output; and
 producing a lower resolution version of the output when the first result is not received, the first result is needed to produce the output, and no previously received result may be utilized to produce the output.

47. The non-transitory processor-readable medium of claim 46, wherein the stored processor-executable software instructions are configured to cause a mobile device CPU to perform operations further comprising:
 determining one or more communication link metrics of the wireless communication link,
 wherein the allocation parameters include the communication link metrics.

48. The non-transitory processor-readable medium of claim 46, wherein the stored processor-executable software instructions are configured to cause a mobile device CPU to perform operations further comprising:
 assigning a task priority to the first processing task based on one or more of a processing task latency tolerance, computational complexity, and significance to the output, wherein the allocation parameters include the task priority; and offloading the first processing task to the auxiliary computing device.

49. The non-transitory processor-readable medium of claim 48, wherein the stored processor-executable software instructions are configured to cause a mobile device CPU to perform operations further comprising concurrently offloading the second processing task to the auxiliary computing device or another auxiliary computing device during offloading the first processing task.

50. The non-transitory processor-readable medium of claim 46, wherein the stored processor-executable software instructions are configured to cause a mobile device CPU to perform operations further comprising dynamically reallocating the first processing task based on changes in the allocation parameters.

51. The non-transitory processor-readable medium of claim 46, wherein the stored processor-executable software instructions are configured to cause a mobile device CPU to perform operations further comprising creating an abstraction layer configured to enable allocating the first processing task between the mobile device CPU and the auxiliary computing device.

52. The non-transitory processor-readable medium of claim 46, wherein the stored processor-executable software instructions are configured to cause a mobile device CPU to perform operations such that assembling the first result of the first processing task with the second result of the second processing task to render the output comprises:
   receiving the first result of the first processing task from the auxiliary computing device;
   determining whether a time for utilizing the first result as part of the output has passed;
   determining whether the first result is useful for a current processing frame or next output frame;
   holding the first result when the time for utilizing the first result as part of the output has passed and the first result is useful for the current processing frame or the next output frame; and
   discarding the first result when the time for utilizing the first result as part of the output has passed and the first result is not useful for the current processing frame or the next output frame.

53. The non-transitory processor-readable medium of claim 46, wherein the stored processor-executable software instructions are configured to cause a mobile device CPU to perform operations such that assembling the first result of the first processing task with the second result of the second processing task to render the output comprises:
   receiving the first result of the first processing task from the auxiliary computing device;
   determining whether the mobile device CPU is ready to utilize the first result as part of the output; and
   holding the first result before the mobile device CPU is ready to utilize the first result as part of the output.

54. The non-transitory processor-readable medium of claim 46, wherein the stored processor-executable software instructions are configured to cause a mobile device CPU to perform operations such that assembling the first result of the first processing task with the second result of the second processing task to render the output comprises:
   receiving the first result of the first processing task from the auxiliary computing device;
   determining whether utilizing the first result as part of the output is dependent on a third result;
   determining whether the third result is available;
   holding the first result when utilizing the first result as part of the output is dependent on the third result and before the third result is available; and
   utilizing the first result as part of the output when utilizing the first result as part of the output is dependent on the third result and the third result is available.

55. The non-transitory processor-readable medium of claim 46, wherein the stored processor-executable software instructions are configured to cause a mobile device CPU to perform operations such that assembling the first result of the first processing task with the second result of the second processing task to render the output comprises:
   determining whether utilizing the first result as part of the output should be utilized with a third result;
   determining whether the third result is available;
   utilizing the first result as part of the output when utilizing the first result as part of the output should be utilized with the third result and the third result is available;
   determining whether utilizing the first result as part of the output can wait for when the third result is available;
   holding the first result when utilizing the first result as part of the output should be utilized with the third result, before the third result is available, and when utilizing the first result as part of the output can wait to be utilized for when the third result is available; and
   utilizing the first result as part of the output when utilizing the first result as part of the output should be utilized with the third result, before the third result is available, and when utilizing the first result as part of the output cannot wait to be utilized for when the third result is available.

56. The non-transitory processor-readable medium of claim 46, wherein the stored processor-executable software instructions are configured to cause a mobile device CPU to perform operations further comprising transferring data over the wireless communication link, wherein transferring the data is accomplished by one of asymmetrical transfer, compressed transfer, and encrypted data transfer.

* * * * *